United States Patent
Ramaswamy et al.

(10) Patent No.: US 10,956,766 B2
(45) Date of Patent: Mar. 23, 2021

(54) BIT DEPTH REMAPPING BASED ON VIEWING PARAMETERS

(71) Applicant: Vid Scale, Inc., Wilmington, DE (US)

(72) Inventors: Kumar Ramaswamy, Princeton, NJ (US); Jeffrey Allen Cooper, Rocky Hill, NJ (US)

(73) Assignee: Vid Scale, Inc., Wilmington, DE (US)

( * ) Notice: Subject to any disclaimer, the term of this patent is extended or adjusted under 35 U.S.C. 154(b) by 103 days.

(21) Appl. No.: 16/099,402

(22) PCT Filed: May 5, 2017

(86) PCT No.: PCT/US2017/031335
§ 371 (c)(1),
(2) Date: Nov. 6, 2018

(87) PCT Pub. No.: WO2017/196670
PCT Pub. Date: Nov. 16, 2017

(65) Prior Publication Data
US 2019/0228253 A1 Jul. 25, 2019

Related U.S. Application Data

(60) Provisional application No. 62/336,458, filed on May 13, 2016, provisional application No. 62/336,459, filed on May 13, 2016.

(51) Int. Cl.
*G06K 9/32* (2006.01)
*H04N 21/2343* (2011.01)
(Continued)

(52) U.S. Cl.
CPC ............ *G06K 9/3233* (2013.01); *G06T 5/009* (2013.01); *G06T 5/40* (2013.01); *H04N 19/102* (2014.11);
(Continued)

(58) Field of Classification Search
CPC .. G06K 9/3233; H04N 21/8456; H04N 19/16; H04N 19/179; H04N 21/85406;
(Continued)

(56) References Cited

U.S. PATENT DOCUMENTS

| 5,892,554 A | 4/1999 | Dicicco |
| 6,282,713 B1 | 8/2001 | Kitsukawa |

(Continued)

FOREIGN PATENT DOCUMENTS

| CA | 2936318 | 8/2015 |
| EP | 1175785 A1 | 1/2002 |

(Continued)

OTHER PUBLICATIONS

CLASSXTEAM, "ClassX Mobile". You Tube Link, published on May 8, 2011, available at: https://www.youtube.com/watch?v=Kul-oCw4hj8.

(Continued)

*Primary Examiner* — Jerome Grant, II
(74) *Attorney, Agent, or Firm* — Invention Mine LLC

(57) ABSTRACT

Systems and methods are described for enabling a client device to request video streams with different bit depth remappings for different viewing conditions. In an embodiment, information indicating the availability of additional remapped profiles is sent in a manifest file. Alternative bit-depth remappings may be optimized for different regions of interest in the image or video content, or for different viewing conditions, such as different display technologies and different ambient illumination. Some embodiments based on the DASH protocol perform multiple depth mappings at the encoder and also perform ABR-encoding for distribution. The manifest file contains information indicating additional remapping profiles. The remapping profiles (Continued)

are associated with different transformation functions used to convert from a higher bit-depth to a lower bit-depth.

20 Claims, 7 Drawing Sheets

(51) Int. Cl.
| | | |
|---|---|---|
| *H04N 19/102* | (2014.01) | |
| *H04N 19/98* | (2014.01) | |
| *H04N 21/845* | (2011.01) | |
| *H04N 19/16* | (2014.01) | |
| *H04N 19/179* | (2014.01) | |
| *H04N 21/854* | (2011.01) | |
| *H04N 21/643* | (2011.01) | |
| *H04N 21/258* | (2011.01) | |
| *G06T 5/00* | (2006.01) | |
| *G06T 5/40* | (2006.01) | |
| *H04N 19/17* | (2014.01) | |

(52) U.S. Cl.
CPC ........... *H04N 19/16* (2014.11); *H04N 19/179* (2014.11); *H04N 19/98* (2014.11); *H04N 21/23439* (2013.01); *H04N 21/25825* (2013.01); *H04N 21/64322* (2013.01); *H04N 21/8456* (2013.01); *H04N 21/85406* (2013.01); *H04N 19/17* (2014.11)

(58) Field of Classification Search
CPC ....... H04N 21/64322; H04N 21/25825; H04N 21/23439; H04N 19/102; H04N 19/98; H04N 19/17; G06T 5/009; G06T 5/40
USPC .......................................................... 382/103
See application file for complete search history.

(56) References Cited

U.S. PATENT DOCUMENTS

| | | |
|---|---|---|
| 6,750,919 B1 | 6/2004 | Rosser |
| 6,973,130 B1 | 12/2005 | Wee |
| 7,079,176 B1 | 7/2006 | Freeman |
| 7,114,174 B1 | 9/2006 | Brooks |
| 7,117,517 B1 | 10/2006 | Milazzo |
| 7,343,617 B1 | 3/2008 | Katcher |
| 7,577,980 B2 | 8/2009 | Kienzle |
| 7,782,344 B2 | 8/2010 | Whittaker |
| 8,055,785 B2 | 11/2011 | Liu |
| 8,243,797 B2 | 8/2012 | Lin |
| 8,331,760 B2 | 12/2012 | Butcher |
| 8,621,000 B2 | 12/2013 | Adimatyam |
| 9,047,236 B2 | 6/2015 | Gigliotti |
| 9,060,187 B2 | 6/2015 | Wu |
| 9,064,313 B2 | 6/2015 | Seshadrinathan |
| 9,137,558 B2 | 9/2015 | Gibbon |
| 9,170,707 B1 | 10/2015 | Laska |
| 9,177,225 B1 | 11/2015 | Cordova-Diba |
| 9,288,545 B2 | 3/2016 | Hill |
| 9,992,553 B2 | 6/2018 | Bennett |
| 10,152,826 B2 | 12/2018 | Saito |
| 2002/0056136 A1 | 5/2002 | Wistendahl |
| 2002/0059588 A1 | 5/2002 | Huber |
| 2002/0065678 A1 | 5/2002 | Peliotis |
| 2002/0120931 A1 | 8/2002 | Huber |
| 2002/0120934 A1 | 8/2002 | Abrahams |
| 2002/0126990 A1 | 9/2002 | Rasmussen |
| 2002/0131511 A1 | 9/2002 | Zenoni |
| 2002/0133817 A1 | 9/2002 | Markel |
| 2002/0147987 A1 | 10/2002 | Reynolds |
| 2002/0174425 A1 | 11/2002 | Markel |
| 2003/0028873 A1 | 2/2003 | Lemmons |
| 2003/0149983 A1 | 8/2003 | Markel |
| 2004/0031062 A1 | 2/2004 | Lemmons |
| 2004/0032495 A1 | 2/2004 | Ortiz |
| 2004/0190779 A1 | 9/2004 | Sarachik |
| 2005/0093976 A1 | 5/2005 | Valleriano |
| 2007/0024706 A1 | 2/2007 | Brannon, Jr. |
| 2007/0077943 A1 | 4/2007 | Hamilla |
| 2007/0086669 A1 | 4/2007 | Berger |
| 2007/0104369 A1 | 5/2007 | Weatherhead |
| 2007/0226761 A1 | 9/2007 | Zalewski |
| 2008/0077965 A1 | 3/2008 | Kamimaki |
| 2008/0127253 A1 | 5/2008 | Zhang |
| 2008/0261711 A1 | 10/2008 | Tuxen |
| 2009/0007023 A1 | 1/2009 | Sundstrom |
| 2009/0046152 A1 | 2/2009 | Aman |
| 2009/0217339 A1 | 8/2009 | Kim |
| 2009/0225164 A1 | 9/2009 | Renkis |
| 2009/0276805 A1 | 11/2009 | Andrews, II |
| 2009/0300692 A1 | 12/2009 | Mavlankar |
| 2009/0316795 A1 | 12/2009 | Chui |
| 2009/0322489 A1 | 12/2009 | Jones |
| 2010/0097221 A1 | 4/2010 | Kreiner |
| 2010/0188531 A1 | 7/2010 | Cordes |
| 2010/0232504 A1 | 9/2010 | Feng |
| 2010/0321389 A1 | 12/2010 | Gay |
| 2011/0013836 A1 | 1/2011 | Gefen |
| 2011/0145430 A1 | 6/2011 | Ha |
| 2011/0299832 A1 | 12/2011 | Butcher |
| 2012/0030637 A1 | 2/2012 | Dey |
| 2012/0062732 A1 | 3/2012 | Marman |
| 2012/0072952 A1 | 3/2012 | Vaysman |
| 2012/0078712 A1 | 3/2012 | Fontana |
| 2012/0195574 A1 | 8/2012 | Wallace |
| 2013/0016910 A1 | 1/2013 | Murata |
| 2013/0031582 A1 | 1/2013 | Tinsman |
| 2013/0036442 A1 | 2/2013 | Wingert |
| 2013/0050268 A1 | 2/2013 | Lohrenz |
| 2013/0061262 A1 | 3/2013 | Briggs |
| 2013/0091430 A1 | 4/2013 | Zhai |
| 2013/0091515 A1 | 4/2013 | Sakata |
| 2013/0155106 A1 | 6/2013 | Rolleston |
| 2013/0167062 A1 | 6/2013 | Herring |
| 2013/0312042 A1 | 11/2013 | Shaw Venson |
| 2013/0342539 A1 | 12/2013 | Khan |
| 2014/0026052 A1 | 1/2014 | Thorwirth |
| 2014/0059457 A1 | 2/2014 | Min |
| 2014/0082054 A1 | 3/2014 | Denoual |
| 2014/0089990 A1 | 3/2014 | Van Deventer |
| 2014/0168056 A1 | 6/2014 | Swaminathan |
| 2014/0192204 A1 | 7/2014 | Glazer |
| 2014/0195918 A1 | 7/2014 | Friedlander |
| 2014/0204206 A1 | 7/2014 | Itoi |
| 2014/0210714 A1 | 7/2014 | Kang |
| 2014/0245367 A1 | 8/2014 | Sasaki |
| 2014/0269932 A1 | 9/2014 | Su |
| 2014/0279068 A1 | 9/2014 | Systrom |
| 2014/0280781 A1 | 9/2014 | Gregotski |
| 2014/0282751 A1 | 9/2014 | Lee |
| 2015/0016504 A1 | 1/2015 | Auyeung |
| 2015/0032901 A1 | 1/2015 | Wang |
| 2015/0062339 A1 | 3/2015 | Ostrom |
| 2015/0070587 A1 | 3/2015 | Emeott |
| 2015/0089023 A1 | 3/2015 | Phillips |
| 2015/0089072 A1 | 3/2015 | Phillips |
| 2015/0104155 A1 | 4/2015 | Bloch |
| 2015/0172775 A1 | 6/2015 | Yee |
| 2015/0179219 A1 | 6/2015 | Gao |
| 2015/0208103 A1 | 7/2015 | Guntur |
| 2015/0222815 A1 | 8/2015 | Wang |
| 2015/0264096 A1 | 9/2015 | Swaminathan |
| 2015/0268822 A1 | 9/2015 | Waggoner |
| 2015/0296250 A1 | 10/2015 | Casper |
| 2015/0348247 A1 | 12/2015 | McLaughlin |
| 2016/0057494 A1 | 2/2016 | Hwang |
| 2016/0073106 A1 | 3/2016 | Su |
| 2016/0156949 A1 | 6/2016 | Hattori |
| 2016/0165309 A1 | 6/2016 | Van Brandenburg |
| 2016/0217623 A1 | 7/2016 | Singh |
| 2016/0269771 A1 | 9/2016 | Bangma |
| 2016/0306036 A1 | 10/2016 | Johnson |
| 2016/0360235 A1* | 12/2016 | Ramasubramonian ..................... H04N 19/587 |

(56) References Cited

U.S. PATENT DOCUMENTS

| | | | |
|---|---|---|---|
| 2016/0364087 | A1 | 12/2016 | Thompson |
| 2016/0366454 | A1 | 12/2016 | Tatourian |
| 2017/0070735 | A1* | 3/2017 | Ramasubramonian ............... H04N 19/70 |
| 2017/0118540 | A1 | 4/2017 | Thomas |
| 2017/0136948 | A1 | 5/2017 | Sypitkowski |
| 2017/0212583 | A1 | 7/2017 | Krasadakis |
| 2017/0236288 | A1 | 8/2017 | Sundaresan |
| 2018/0098063 | A1* | 4/2018 | Chen .................... H04N 19/105 |
| 2019/0320189 | A1* | 10/2019 | Cooper ............. H04N 21/4728 |

FOREIGN PATENT DOCUMENTS

| | | | |
|---|---|---|---|
| EP | 1443768 | A1 | 8/2004 |
| EP | 2426645 | A1 | 3/2012 |
| EP | 2530675 | A2 | 12/2012 |
| EP | 2824883 | A1 | 1/2015 |
| EP | 2824885 | | 1/2015 |
| EP | 2919471 | | 9/2015 |
| EP | 3076672 | A1 | 10/2016 |
| EP | 3110160 | A1 | 12/2016 |
| EP | 2408196 | | 1/2017 |
| JP | 2009207114 | * | 9/2009 ............... H04N 7/26 |
| KR | 20160021141 | A | 2/2016 |
| WO | 2001018658 | A1 | 3/2001 |
| WO | 2010021705 | | 2/2010 |
| WO | 2012021246 | | 2/2012 |
| WO | 2014057131 | | 4/2014 |
| WO | 2014067566 | | 5/2014 |
| WO | 2014111423 | A1 | 7/2014 |
| WO | 2014190308 | A1 | 11/2014 |
| WO | 2015014773 | A1 | 2/2015 |
| WO | 2015059194 | A1 | 4/2015 |
| WO | 2015130796 | | 9/2015 |
| WO | 2015197815 | | 12/2015 |
| WO | 2015197815 | A1 | 12/2015 |
| WO | 2016040833 | A1 | 3/2016 |
| WO | 2016098056 | A1 | 6/2016 |
| WO | 2017061297 | | 4/2017 |
| WO | 2017196670 | A1 | 11/2017 |

OTHER PUBLICATIONS

International Telecommunication Union, "Advanced Video Coding for Generic Audiovisual Services". Series H: Audiovisual and Multimedia Systems, ITU-T, H.264, Feb. 2014, 790 pages.
International Organization for Standardization, "Information Technology—Dynamic Adaptive Streaming Over HTTP (DASH), Part 1: Media Presentation Description and Segment Formats/ Amendments 2: Spatial Relationship Description, Generalized URL Parameters and Other Extensions". International Standard, ISO/IEC 23009-1:2015/FDAM 2:2015(E), Second Edition (Annex H), Feb. 25, 2015, 23 pages.
IBC, "D-Zero—Low Latency ABR Streaming". Sky Italia, available at: http://www.ibc.org/ibc-awards/ibc2016-innovation-award-entrants/ibc-innovation-award-for-content-delivery-2016-entrants, Sep. 2016.
IBC, "True live OTT Solution Puts F1 in Pole Position". Tata Communications, available at: http://www.ibc.org/ibc-awards/ibc2016-innovation-award-entrants/ibc-innovation-award-for-content-delivery-2016-entrants, Sep. 2016.
SYE, "SYE". Web Archive dated Sep. 5, 2016, available at: https://netinsight.net/start/technical-offer-sye/, 1 page.
Sun, Lei, et. al., "The Dynamic Videobook: A Hierarchical Summarization for Surveillance Video". IEEE International Conference on Image Processing, (2013), pp. 3963-3966.
Tatacomms . "Transforming media + entertainment (subtitles)". Youtube link dated Sep. 10, 2015, available at: https://w,w.youtube.com/watch?v=KUxxPYocMiw, 19 pages.
Tata Communications, "Media and Entertainment Services". Tata Communications, Archived on Feb. 27, 2017. Retrieved from https://web.archive.org/web/20170217212843/https://www.tatacommunications.com/products-services/enterprises/media-entertainment-services, 1 page.
Notification of Transmittal of the International Search Report and the Written Opinion of the International Searching Authority, or the Declaration for PCT/US2017/031335 dated Jul. 19, 2017, 16 pages.
Rafal Mantiuk et al: "Display adaptive tone mapping", ACM Transactions on Graphics (TOG), vol. 27, No. 3, Aug. 1, 2008 (Aug. 1, 2008), pp. 68.1-68.10, XP055365416, US, ISSN: 0730-0301, DOI: 10.1145/1360612.1360, the whole document.
Alex Giladi: "Use Cases for Conveying Source Information", 106. MPEG Meeting; Oct. 28, 2013-Jan. 11, 2013; Geneva; (Motion Picture Expert Group or ISO/IEC JTC1/SC29/WG11), No. m31594, Oct. 27, 2013 (Oct. 27, 2013), XP030060046, the whole document.
Written Opinion of the International Preliminary Examining Authority for PCT/US2017/031335 dated Apr. 5, 2018.
International Preliminary Report on Patentability for PCT/US2017/031335 completed on Jun. 26, 2018.
Liu S. et al: "SVC inter-layer pred for SVC bit-depth scalability", 24. JVT Meeting; 81. MPEG Meeting; Jun. 29, 2007-Jul. 5, 2006; Geneva, CH; (Joint Video Team of ISO/IEC JTC1/SC29/WG11 and ITU-T SG.16), No. JVT-X075, Jun. 30, 2007 (Jun. 30, 2007), XP030007182, ISSN: 0000-0152.
International Search Report and Written Opinion of the International Searching Authority for PCT/US2017/041142 dated Oct. 11, 2017.
Written Opinion of the International Preliminary Examining Authority for PCT/US2017/041142 dated Jun. 20, 2018.
International Preliminary Report on Patentability for PCT/US2017/041142 completed on Sep. 19, 2018.
International Organization for Standardization, "Information Technology—Dynamic Adaptive Streaming Over HTTP (DASH), Part 1: Media Presentation Description and Segment Formats". International Standard, ISO/IEC 23009-1, Second Edition, May 15, 2014, 152 pages.
Lavigne, F., "Automatic Video Zooming for Sport Team Video Broadcasting on Smart Phones". Available at: http://tcts.fpms.ac.be/publications/papers/2010/visapp2010_flfcxd.pdf, (2010), 7 pages.
Mavlankar, A., et al., "An Interactive Region-of-Interest Video Streaming System for Online Lecture Viewing". Proceedings of 2010 IEEE 18th International Packet Video Workshop, Dec. 13-14, 2010, pp. 64-71.
International Search Report and The Written Opinion of the International Searching Authority for PCT/US2016/046317, dated Oct. 19, 2016, 11 pages.
International Preliminary Report on Patentability for PCT/US2016/046317 dated Mar. 1, 2018.
Mavlankar, A., et. al., "Optimal Slice Size for Streaming Regions of High Resolution Video with Virtual Pan/Tilt/Zoom Functionality", Jun. 2007. Available at: http://web.stanford.edu/~bgirod/pdfs/MavlankarEUSIPCO07.pdf.
Written Opinion of the International Preliminary Examining Authority for PCT/US2016/053512 dated Aug. 28, 2017.
International Preliminary Report on Patentability, Corrected Version, for PCT/US2016/053512 completed Jan. 15, 2018.
International Preliminary Report on Patentability for PCT/US2016/053512 completed Jan. 15, 2018.
International Search Report and Written Opinion of the International Searching Authority for PCT/US2016/053512, dated Nov. 28, 2016, 10 pages.
Yilmaz, A., et. al., "Object Tracking—A Survey". ACM Computing Surveys, vol. 38, No. 4, Article 13, Dec. 2006, pp. 1-45.
International Organization for Standardization, "Information Technology—Dynamic adaptive Streaming Over HTTP (DASH)—Part 3: Implementation Guidelines/AMD 1: Alignment with ISO/IEC 23009-1:2014 and Extensibility". International Standard, ISO/IEC JTC 1/SC 29N, ISO/IEC TR 23009-3:2014/PDAM1, ISO/IEC JTC 1/SC 29/WG11, No. N15990, Mar. 2, 2016, 49 pages.
International Search Report and Written Opinion of the International Searching Authority for PCT/US2017/040060 dated Sep. 11, 2017, 15 pages.

(56) References Cited

OTHER PUBLICATIONS

Wang, X., et. al., "Multi-Stream Streaming in DASH (Multi-Stream DASH)". Huawei Technology, LTD., Motion Picture Expert Group (MPEG) Meeting, No. m35885, Feb. 2015, 8 pages.

International Preliminary Report on Patentability for PCT/US2017/040060 dated Jan. 1, 2019.

International Search Report and Written Opinion of the International Searching Authority for PCT/US2017/026388 dated Jul. 24, 2017, 14 Pages.

Written Opinion of the International Preliminary Examining Authority for PCT/US2017/026388 dated Mar. 5, 2018.

International Preliminary Report on Patentability for PCT/US2017/026388 completed on Jul. 12, 2018.

International Search Report and Written Opinion of the International Searching Authority for PCT/US2018/018540 dated Apr. 6, 2018.

Mavlankar, A. et. al., "An Interactive Region-Of-Interest Video Streaming System for Online Lecture Viewing". Proceedings of 2010 IEEE 18th International Packet Video Workshop Dec. 13-14, 2010, pp. 64-68.

Written Opinion of the International Preliminary Examining Authority for PCT/US2018/018540 dated Jan. 18, 2019, 7 pages.

International Preliminary Report on Patentability for PCT/US2018/018540 completed Apr. 26, 2019, 7 pages.

Ubuntu, "Display Adaptive Tone Mapping". Ubuntu Manuals, available at: <http://manpages.ubuntu.com/manpages/xenial/en/man1/pfstmo_mantiuk08.1.html, (2010), 7pages.

Invitation to pay additional Fees for PCT/US2018/020229, issued by the International Searching Authority, and dated Jun. 8, 2018, 14 pages.

International Search Report and Written Opinion of the International Searching Authority for PCT/US2018/020229 dated Jul. 31, 2018, 18 pages.

Brandenburg, R., et., al., "Immersive Second-Screen Experiences Using Hybrid Media Synchronization". Media Synchronization Workshop, (2013), 7 pages.

HBB NEXT, "Immersive Second Screen Synchronization". HBB Next, Next Generation Hybrid Media, Applications, available at: http://www.mediafutureweek.nl/wp-content/uploads/2014/05/poster_IBC_2013_applications.pdf, (2013), 1 page.

Niamut, O.A., et. al., "Live Event Experiences—Interactive UHDTV On Mobile Devices". IBC2014 Conference, Sep. 11-15, 2014, 8 pages.

Lindgren, P., et., al., "How True, Synchronized Live OTT Can Change the Second Screen and Social TV Game". IBC2016 Conference, Sep. 8-12, 2016, pp. 1-8.

Mavlankar, A. et. al., "Video Streaming with Interactive Pan/Tilt/Zoom", Oct. 2009. Available at: http://web.stanford.edu/~bgirod/pdfs/Mavlankar_Girod_Chapter_Oct09.pdf.

Unifore Security, "What's ROI (Region of Interest) Video Surveillance Technology?". Unifore.net, Oct. 23, 2015, 4 pages.

Mavlankar, A., et. al., "Peer-To-Peer Multicast Live Video Streaming with Interactive Virtual Pan/Tilt/Zoom Functionality". In 2008 15th IEEE International Conference on Image Processing, Oct. 2008, pp. 2296-2299.

Chen, Y., et. al., "Intra-And-Inter-Constraint-Based Video Enhancement Based on Piecewise Tone Mapping". IEEE Transactions on Circuits and Systems for Video Technology, vol. 23, No. 1, Jan. 2013, pp. 74-82.

Vehkapera, J., et. al., "Replacing Picture Regions in H. 264/AVC Bitstream by Utilizing Independent Slices". Proceedings of 2010 IEEE 17th International Conference on Image Processing, Sep. 26-29, 2010, pp. 3397-3400.

Loungev Films, "HD 1080p—Nature Scenery Video". YouTube link available at: www.youtube.com/watch?v=DQuhA5ZCV9M, published on Jan. 13, 2016, 3 pages.

FLOWPLAYER—"Bandwidth Detection". Web Archived dated Dec. 24, 2016. Retrieved from http://web.archive.org/web/20161224034909/http://flash.flowplayer.org/plugins/streaming/bwcheck.html.

International Preliminary Report on Patentability for PCT/US2018/020229 dated Sep. 10, 2019, 12 pages.

Shibata, F., et. al., "A View Management Method for Mobile Mixed Reality Systems". In Virtual Environments 2008: 14th Eurographics Symposium on Virtual Env., May 29-30, 2008, 8 pages.

International Search Report and Written Opinion of the International Searching Authority for PCT/US2017/043248 dated Oct. 5, 2017.

Written Opinion of the International Preliminary Examining Authority for PCT/US2017/043248 dated Jun. 28, 2018.

International Preliminary Report on Patentability for PCT/US2017/043248 completed Sep. 27, 2018.

Taylor, T. "NFL using Zebra RFID Chips to Track Player Movements, Gather Data". Sports Illustrated article, available at: http://web.archive.org/web20160703053654/http://www.si.com:80/, updated Mar. 6, 2015, 4 pages.

Zebra, "Zebra and the NFL: Change the Game". Zebra.com article, available at: http://web.archive.org/web/20160604013821/https://www.zebra.com/us/en/nfl.html, web archive dated Jun. 4, 2016, 4 pages.

Sheikh Y., et. al., "Geodetic Alignment of Aerial Video Frames". In Shah M., Kumar R. (eds) Video Registration, Chapter 7, (2003), pp. 141-177.

"NASCAR Pointer Screen Capture", retrieved from video available at: http://www.sportvision.com/media/pointers, on Jul. 8, 2016, 1 page.

Aberdeen, "Case Study: FCC Challenges Video Editors to Make Room for Caption Placement", Aug. 4, 2015, 3 pages.

\* cited by examiner

BIT DEPTH REMAPPING BASED ON VIEWING PARAMETERS

CROSS-REFERENCE TO RELATED APPLICATIONS

The present application is a national stage application under 35 U.S.C. 371 of International Application No. PCT/US2017/031335, entitled BIT DEPTH REMAPPING BASED ON VIEWING PARAMETERS, filed on May 5, 2017, which claims benefit under 35 U.S.C. § 119(e) from U.S. Provisional Patent Application Ser. No. 62/336,458, entitled "Bit Depth Remapping Based on Viewing Parameters," filed May 13, 2016, and U.S. Provisional Patent Application Ser. No. 62/336,459, entitled "Bit Depth Selection Based on Viewing Parameters," filed May 13, 2016, the entirety of which are incorporated herein by reference.

BACKGROUND

Video streaming services may be constrained by multiple factors in using a bit depth for displaying images to an end user. In many video distribution systems, a source image is captured at a high bit depth, such as 10-16 bits per sample (bps) and is converted to a lower bit depth, such as 8 bps before the source is delivered to a display. At 16 bps, a sample can have over 65,000 different values, but at 8 bps, the sample can only have 256 different values. This conversion, or remapping, reduces bitrate but may result in a reduction in video quality.

Some user displays have contrast and brightness buttons to adjust visibility of the image. These buttons adjust the entire image, not just a particular region of interest. Also, these buttons use the down-converted low dynamic range (LDR) signal without knowledge of the source high dynamic range (HDR) signal.

It would be desirable to improve video quality without incurring substantial increases in video distribution bitrate. These constraints force a high source bit depth to be converted to a lower bit depth for displaying images at the client. In a traditional distribution, the source image is converted to 8 bps before the video is delivered to a display. This methodology may cause banding and loss of detail.

It would be desirable to improve video quality without unnecessarily increasing the bitrate requirements.

SUMMARY

This specification discloses in an exemplary embodiment the ability to perform multiple bit-depth remappings at the encoder which are then encoded for adaptive bit rate (ABR) distribution. The multiple bit-depth remappings may correspond to different conversion functions. Information indicating availability of additional remapped profiles is sent down in a manifest file for a client to use and to interpret for display to the user. The multiple alternative bit-depth remappings may be designed for (e.g., optimized for) different regions of interest in the image or video content, different display technologies which may be used to view the content, or different viewing conditions.

Some embodiments are based on Dynamic Adaptive Streaming over HTTP (DASH). In some such embodiments, multiple depth mappings are performed at the encoder, and ABR-encoding is performed for distribution. The manifest file containing information indicating availability of additional remapping profiles is sent down to a client to use and interpret for display to the user. The additional remapping profiles contain information regarding the multiple transformation functions or conversion functions used to convert from a higher bit-depth to a lower bit-depth.

The client uses the video stream's generation conditions to provide the end user with a better viewing experience. Within the DASH protocol, a Media Presentation Description (MPD) manifest file contains bit depth profiles that provide the client with options to select optimal viewing parameters under multiple viewing conditions.

DETAILED DESCRIPTION

Figure 1:
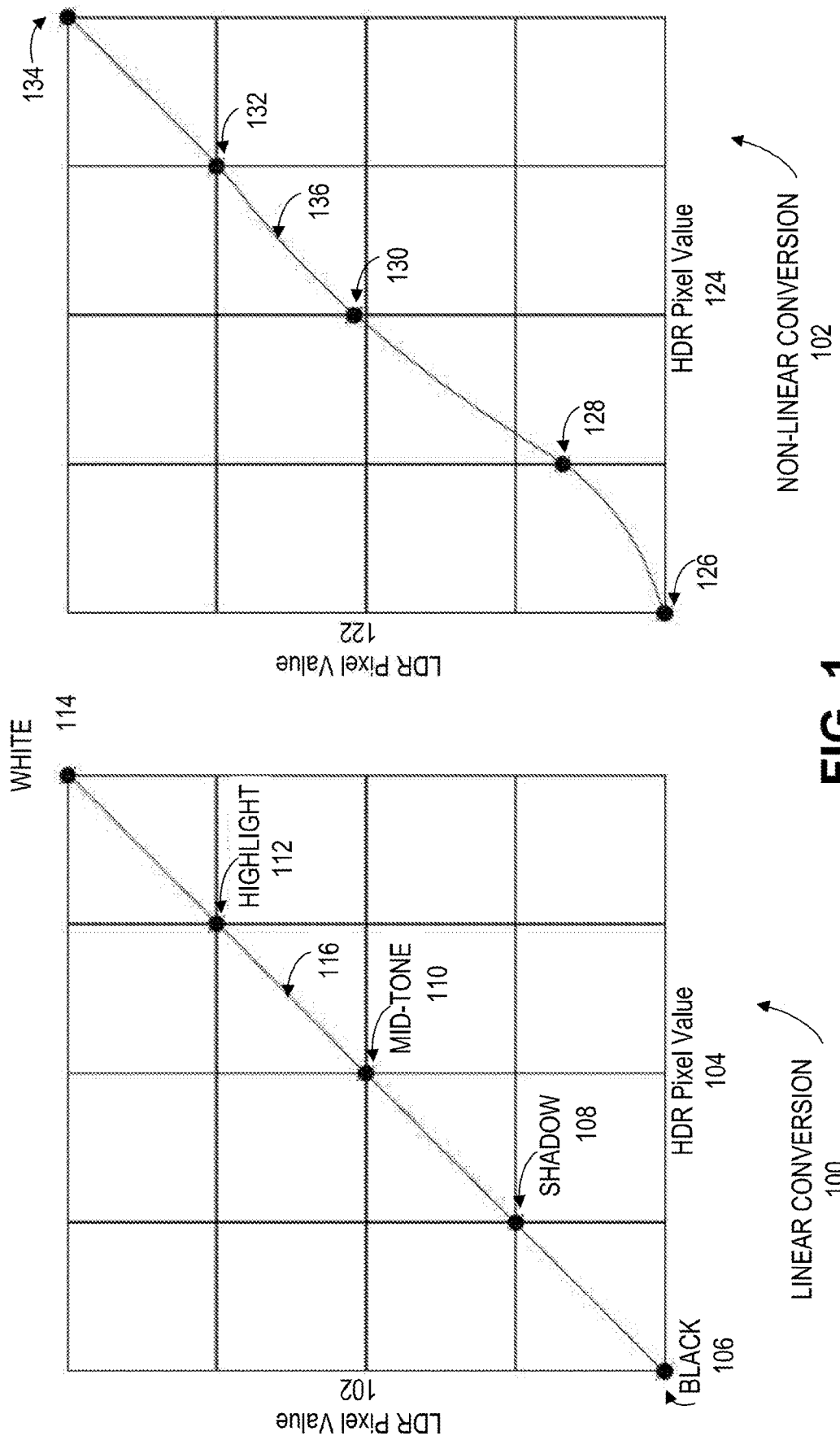
FIG. 1 depicts two graphs showing linear and non-linear HDR to LDR conversions, in accordance with an embodiment.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions may take the form of or include hardware (i.e., hardwired) instructions, firmware instructions, software instructions, and/or the like, and may be stored in any suitable non-transitory computer-readable medium or media, such as commonly referred to as RAM, ROM, etc.

In an exemplary embodiment, the system performs several steps. Other embodiments may reverse these steps or skip one or more of these steps. In addition to the standard ABR stream, the encoder creates additional streams that are created by different remappings. The end user requests a service and receives a manifest file that identifies high bit depth streams that are available in addition to containing traditional information about the ABR profiles for the default stream. The user interface (UI) informs the user about the availability of additional streams that represent different remappings for different device types and/or different viewing conditions. An exemplary embodiment provides three stream selection types at the client: automatic, manual, and visual. For automatic stream selection, the end client automatically detects the viewing conditions, such as level of ambient light, and the type of display, and requests an appropriate stream. For manual stream selection, the UI presents the end user with an array of options from which to choose a variety of remappings representing different viewing device types or viewing conditions. For visual stream selection, the client requests regions/objects for further highlighting in a video scene. Alternative remappings for specific regions may be presented. Based on end user choices, scenes may be selected and replayed with different bit depth(s).

In some embodiments, tracking of objects of interest may be performed, providing the user the opportunity to track those objects at the highest capture resolution and get this delivered on request with alternative stream delivery. For example, a 4K resolution camera at the source normally may be scaled by ¼ down to HD resolution for transmission. However, when zooming on a portion of the scene, the native 4K resolution may be used fully.

In addition to creating additional streams by using increased native resolutions, viewing quality may be enhanced by creating streams with a higher dynamic range (HDR) (or high pixel bit depth). In some scenarios, a camera captures between 8 to 16 bits per pixel (bpp). The higher the bit depth, the greater the detail or quality of picture that may be produced.

Consumer devices including HDTVs, mobile devices, or computers are generally equipped to receive video pixel bit depths of 8 bpp. Current consumer display technology such as LCD, LED, and Plasma, find their sweet spot for cost effectiveness around 8 bpp. Higher bit depth displays (known as High Dynamic Range or HDR) exist, but these displays have a high cost.

One TV distribution scenario uses a camera which captures video at a high bit depth (such as 10-16 bpp). This signal is converted to a low dynamic range (LDR), such as 8 bpp, for broadcast delivery to a consumer display. At 16 bpp, a pixel (or each component of a pixel such as an R, G, or B component, a Y, U, or V component or a Y, Cr, or Cb component) may be assigned one of 65,536 ($2^{16}$) different values, but at 8 bpp, a pixel may be assigned one of only 256 ($2^8$) different values.

Conversion from HDR to LDR may result in a variety of video quality problems, such as loss of detail, reduced dynamic range, image artifacts, and problems at the extremes of the brightness scale. Loss of detail causes flattening or complete loss of fine textures. Reduced dynamic range may result in black colors being less black, and white colors being less white, for example. Image artifacts include banding instead of smooth gradients and stair-step edge artifacts. Brightness problems may include issues with objects in dark or bright sections of the image appearing severely degraded or even washed out.

In converting from HDR to LDR, the conversion may be linear or non-linear. Non-linear conversions may be used to provide contrast enhancements and other effects. Some embodiments may be described as an "S" shaped conversion curve in which the horizontal axis is the HDR input pixel value and vertical axis is the LDR output pixel value. Non-linear curves may provide more detail in certain pixel value ranges and less detail in other pixel value ranges. For example, mid-tones may receive a relatively greater proportion of the available dynamic range than dark or light tones.

FIG. 1 depicts two graphs showing linear and non-linear HDR to LDR conversions, in accordance with an embodiment. In particular, FIG. 1 depicts the graph 100 of a linear HDR to LDR conversion, also referred to as a transformation function or mapping. The graph 100 includes an LDR Pixel Value y-axis 102 and an HDR Pixel Value x-axis 104. Several points along the conversion line 116 are depicted. The points include a black point 106, a shadow point 108, a mid-tones point 110, a highlights point 112, and a white point 114. The graph 120 depicts a non-linear HDR to LDR conversion. The graph 120 includes for LDR Pixel Value y-axis 122 and an HDR Pixel Value x-axis 124. Several points along the conversion curve 136 are depicted. The points include a black point 126, a shadow point 128, a mid-tones point 130, a highlights point 132, and a white point 134. The graph 120 depicts a non-linear conversion. An S curve non-linear conversion may over-flatten mid-tones, and a very gentle S curve or partial S curve may also be used. Both curves call attention to five pixel-value points and the conversion of those values for each curve. Black and white values anchor each end of the curve with shadows, mid-tones, and highlights occurring at successive midpoints.

Converting from HDR (e.g. 16 bpp) to LDR (e.g. 8 bpp) prior to delivery to a display may cause banding, loss of detail, and other image effects.

Optimal bit depth conversion mappings depend on a video signal's pixel characteristics. Such HDR to LDR conversion maps may vary per-pixel, per region, or per frame. Applying a single conversion map to an entire frame may result in some portions of the frame receiving non-optimal mappings. Re-computation of the optimal mapping may be performed when temporal variations with a region change significantly (even when tracked). For example, a given image (or frame of a video sequence) may have one portion in the shadows and another portion in bright light. Such a scenario may benefit from application of different conversion maps in different regions.

By changing the conversion to increase sensitivity for dark areas, textures remain visible after the conversion. This change comes as a tradeoff to the bright areas, which become washed out. Therefore, it is beneficial to separate the total image into regions of interest with different conversions available for each area. Alternatively, different mapping sets may be created for different viewing device types and different ambient viewing conditions.

A region of interest may be defined in the original content, and different conversion functions may be designed (e.g., optimized) to distribute pixel values within the region of interest. This process may be repeated to generate multiple regions of interest in the source material, and to create conversion functions for each of the multiple regions of interest, or for combinations of such regions of interest.

The regions of interest may be defined manually. For example, a human content producer or artist may trace the regions of interest on a displayed frame of content in a user interface, and the traced outline may be used to define the region of interest. Alternately, the regions of interest may be assigned automatically. For example, an edge detection algorithm may be used to detect strong edges which may represent region boundaries. For another example, the image may be divided into patches (e.g., regular patches or blocks) and a local histogram may be generated from the pixels in each patch. A comparison or clustering algorithm may be used to merge patches with similar histograms. If desired, merging may be restricted to spatially neighboring patches to produce spatially contiguous regions. This technique may be used to detect regions with similar pixel value distributions and regions of interest. Another example uses an object detection/segmentation algorithm to detect objects of interest, and the image region occupied by the object may be used as an ROI. In each case, the ROI may occupy an arbitrary shape, or it may be restricted to a rectangular shape.

An ROI may be generated for a particular image (e.g., at a particular point in time), or it may span a range of time. In the latter case, the boundaries which define the ROI (or alternately, the footprint of the ROI in the image) may vary across time. For example, an ROI may track an object which changes size, changes shape, or moves across the screen.

Figure 2:
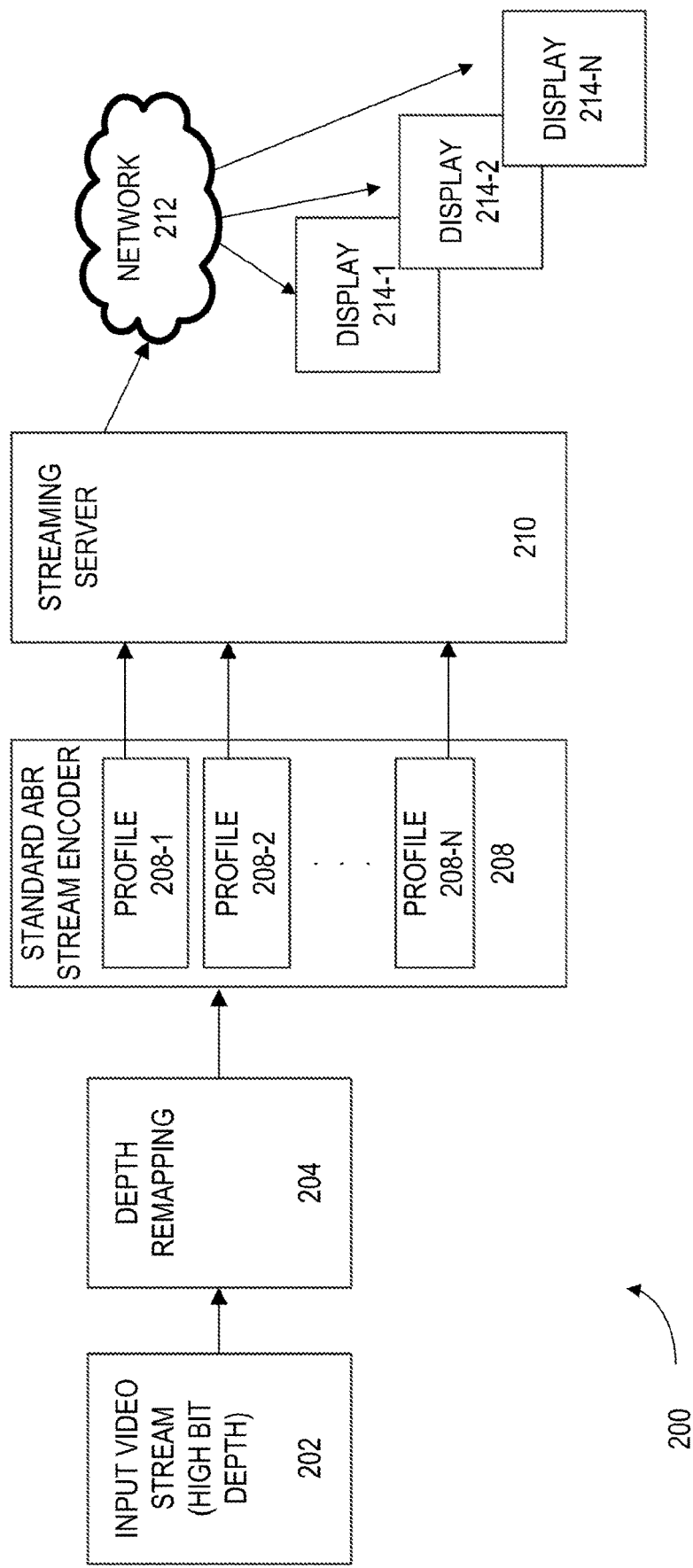
FIG. 2 is a block diagram of a system architecture for converting HDR to LDR for ABR distribution, in accordance with an embodiment.

FIG. 2 is a block diagram of a system architecture for converting HDR to LDR for adaptive bit rate (ABR) distribution, in accordance with an embodiment. In particular, FIG. 2 depicts the system architecture 200 that includes an input video stream 202, a depth remapping module 204, a standard ABR stream encoder 208, a streaming server 210, a network 212, and display devices 214-1 through 214-N. The input video stream 202 is at a high bit depth (e.g., 10, 12, or 16 bit) and is provide to the depth remapping module 204. The depth remapping module 204 converts the HDR video stream into a LDR video stream, for example, into an 8-bit video stream, which is provided to the ABR encoder 208. The ABR encoder is able to encode the video into several different profiles, shown as 208-1, 208-2 through 208-N. Each of the ABR profiles are provided to the streaming server 210 for distribution through the network 212 to the plurality of display devices 214.

Figure 3A:
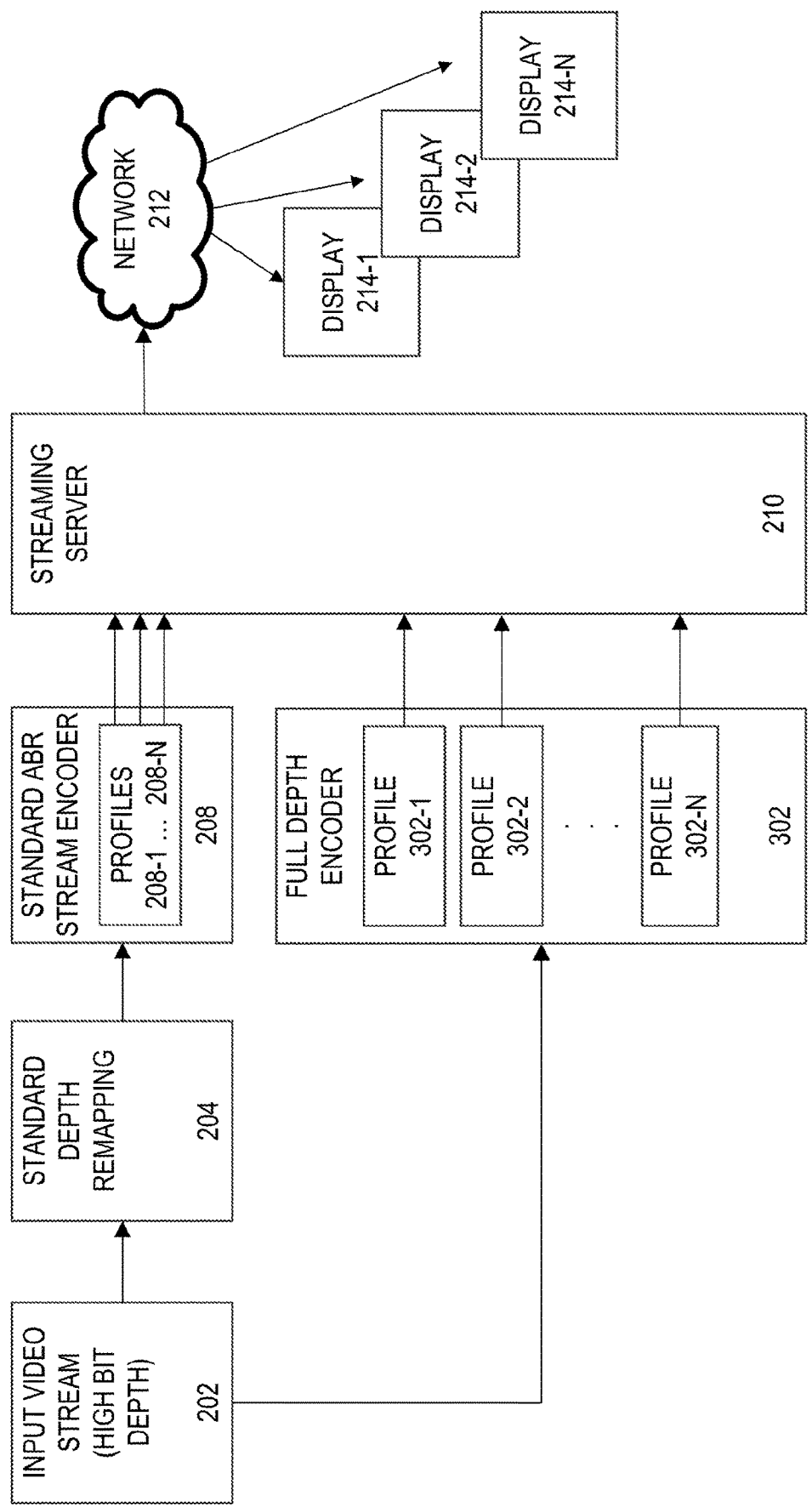
FIG. 3A depicts a first system architecture for distributing media content to a display device, in accordance with an embodiment.

FIG. 3A depicts a first system architecture for distributing media content to a display device, in accordance with an embodiment. In particular, FIG. 3A depicts the system 300 that includes many of the elements of FIG. 2, but also includes a full depth encoder 302. The input video stream 202, at a high bit depth, is delivered to a standard depth remapping module 204 and a full depth encoder 302. The profiles 208-1 to 208-N represent a set of streams prepared using a default bit-depth remapping. Such streams, for example, may be used by a client (e.g., a legacy client) that lacks the capability to select from among multiple alternative bit-depth remappings. Or, such streams may be used by a client that lacks information regarding the display device type or that is unable to ascertain the current viewing conditions. Or again, such streams may be used initially by a client to display a default view to a user (e.g., before a user requests a view which uses new remapping streams).

The default bit-depth remapping may use a conversion function which does not take into account a specific ROI, a specific display technology, or a specific set of viewing conditions. For example, the default bit-depth remapping may be a standard bit-depth remapping not designed (e.g., not optimized) based on the content. Alternately, the default bit-depth remapping may be generated from the pixel distribution properties of the content overall without focusing on a specific region. The default bit-depth remapping may make a default assumption of the display type used or the viewing conditions encountered.

The full depth encoder 302 creates different profiles 302-1, 302-2 to 302-N that represent an alternate mappings (e.g., using an alternative conversion function, or transformation function) for the HDR to LDR conversion. In some embodiments, more than two such remappings are created, with different remappings using different HDR to LDR conversion functions to highlight different contrast requirements. Each alternative remapping may be designed for (e.g. optimized for) a region of interest, a type of display technology, a set of viewing conditions, or some combination of these.

The remappings at the server may be tailored for viewing on different devices or conditions. Traditional gamma adjustments and contrast enhancements done by a viewing monitor adjust the overall picture for bright and dark image areas. This specification discloses tailoring the remappings to improve overall dynamic contrast and overall viewing experience.

The streaming server 210 is configured to transmit a video stream over a network to different display devices 214 via the network 212. The network 212 may be a local network, the Internet, or other similar network. The display devices 214 include devices capable of displaying the video, such as a television, computer monitor, laptop, tablet, smartphone, projector, and the like. The video stream may pass through an intermediary device, such as a cable box, a smart video disc player, a dongle, or the like. The client devices may each remap the received video stream to best match the display and viewing conditions.

Figure 3B:
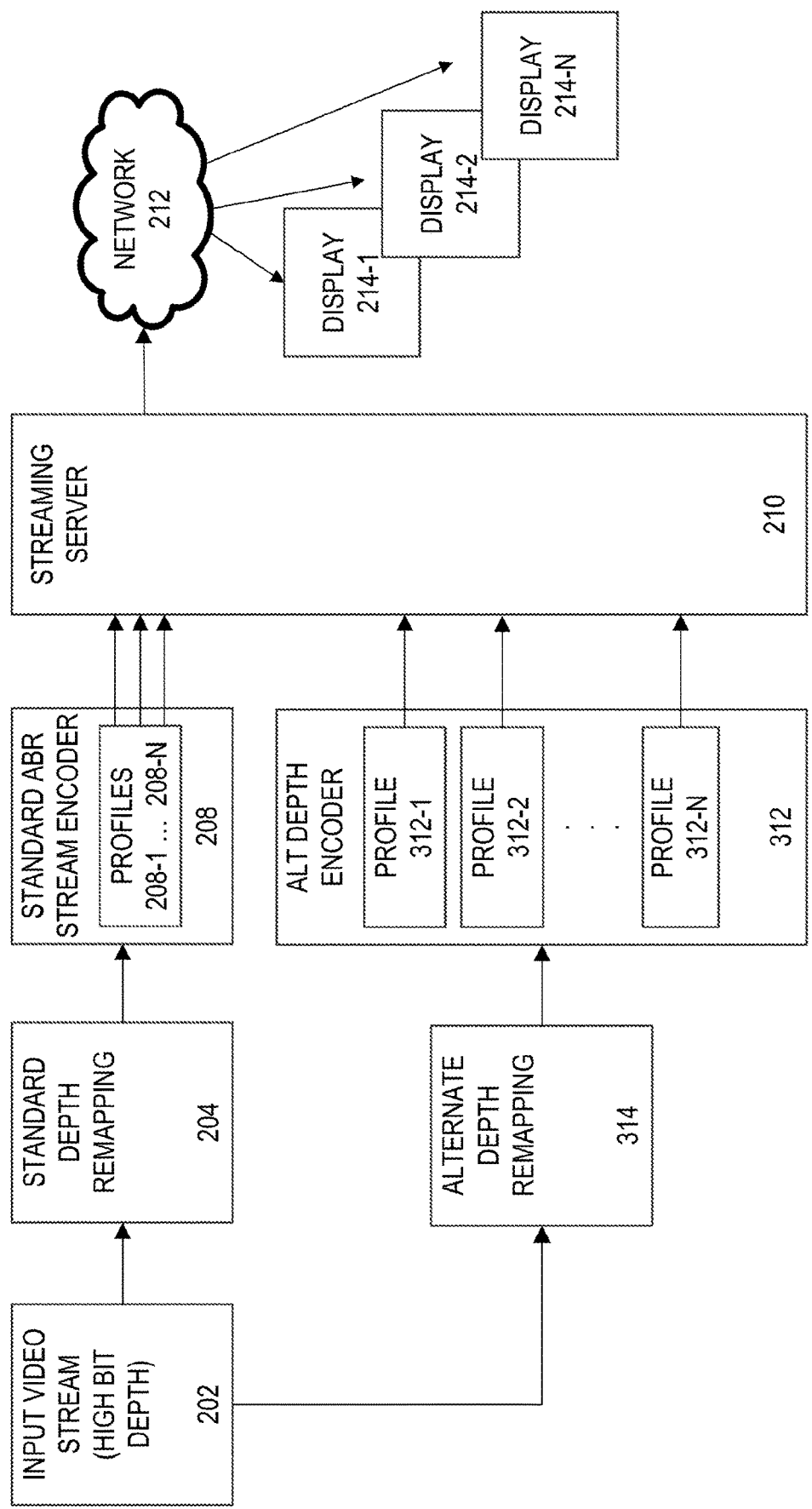
FIG. 3B depicts a second system architecture for distributing media content to a display device, in accordance with an embodiment.

FIG. 3B depicts a second system architecture for distributing media content to a display device, in accordance with an embodiment. In particular, the FIG. 3B depicts the system 310 that is similar to the system 300 of FIG. 3A, but also includes an alternate depth remapping 314 that provides alternate depth streams to the alternate depth encoder 312. The alternate depth encoder acts similar to the standard ABR stream encoder 208 but produces the profiles 312-1, 312-2 to 312-N.

The alternate depth remapping module 314 represents a different mapping (e.g., using an alternative conversion function) for the HDR to LDR conversion. In some embodiments, more than two such remappings are created, with different remappings using different HDR to LDR conversion functions to highlight different contrast requirements. Each alternative remapping may be designed for (e.g. optimized for) a region of interest, a type of display technology, a set of viewing conditions, or some combination of these.

The standard depth and alternate depth encoded videos at the streaming server 210 may be selected to optimize viewing on different devices or during different viewing conditions. Traditional gamma adjustments and contrast enhancements done by a viewing monitor adjust the overall picture for bright and dark image areas. This specification discusses selection of remappings to improve overall dynamic contrast and overall viewing experience.

TABLE 1 includes an exemplary a media presentation description (MPD), in accordance with an embodiment. The MPD includes an example of a Dynamic Adaptive Streaming over HTTP (DASH) media presentation description for various bit depth representations, which may serve as a manifest of information available regarding the video streams. The MPD includes information regarding the different bit depths available, here an 8 bit H.264 stream and a 10 bit H.264 stream. This information is included in the codec code. The codec "avc1.644029" indicates H.264 8 bit high profile with level 4.1 available, and the codec "avc1.6e4029" indicates H.264 10 bit high profile with level 4.1 available. The client may receive the MPD, and may infer the bit depth of each content representation from the codec code. Although not shown in the example, additional signaling may be introduced to explicitly indicate the bit depth of each content representation (e.g. a dedicated bit depth indication field could be introduced into the XML schema). The sample MPD may contain additional information depending on various parameters of interest to the end user, the device type, and the device viewing conditions.

TABLE 1

```
<?xml version="1.0" encoding="UTF-8"?>
<MPD
..
<ProgramInformation>
<Title>Example of a DASH Media Presentation Description for bit depth representations</Title>
</ProgramInformation>
<Period>
<!--Video with 2 bit depth representations-->
<AdaptationSet segmentAlignment="true" subsegmentAlignment="true" subsegmentStartsWithSAP="1">
<Role schemeIdUri="urn:mpeg:dash:role:2011" value="main"/>
<SupplementalProperty schemeIdUri="urn:mpeg:dash:rtvideoparam:2014" value="1920,1080"/>
<Representation mimeType="video/mp4" codecs="avc1.644029" width="1920" height="1080"
bandwidth="1055223" >
    <BaseURL> video1.mp4</BaseURL>
    <SegmentBase indexRangeExact="true" indexRange="839-990"/>
</Representation>
<Representation mimeType="video/mp4" codecs="avc1.6e4029" width="1920" height="1080"
bandwidth="12500600">
    <BaseURL> video2.mp4</BaseURL>
    <SegmentBase indexRangeExact="true" indexRange="839-990"/>
</Representation>
</AdaptationSet>
```

The cueing for an alternate bit depth stream being sent to the client may take different forms. The cueing may be automatic, manual, visual, semi-automatic, based on regions of interest, or any combination of methods. In an automatic cueing, the end client application is configured to determine the bit depth of the video stream based on the viewing conditions and viewing device type. The client then sends a request signal for the full bit depth stream and remaps the full bit depth stream into a lower bit depth stream as determined by the client device.

In exemplary embodiments of manual cueing, the end user is presented the options and different settings based on information contained in the manifest. The different settings comprise a variety of remappings able to be displayed on the client device. The user selects, via a user interface on the client device, one of the remappings to display.

In exemplary embodiments of visual cueing, the client device is displaying a video stream and receives a request to pause the video stream. While the video stream is paused, the client device receives user input regarding a region of interest. The user input may be free-form (e.g. a user dragging a bounding rectangle to define a region of the screen in which the user is interested). Alternately the user input may select a region of interest from one or more regions of interest identified to the user by the client. These may reflect regions of interest which the server has identified to the client (e.g. in metadata sent in a manifest file to identify the regions of interest, or in metadata sent in-band along with the media segments). The client may indicate the regions of interest in a UI, and may allow the user to select one of the regions of interest. The client device may request a high bit depth stream from the server, if not already receiving the high bit depth stream, and the client may remap the defined or selected region of interest for the high bit depth region. (For example, the client may analyze the distribution of pixel values in one or more frames of the region of interest, and may design an appropriate remapping function to enhance the viewing of the region of interest. This remapping function may be applied only to the region of interest, or it may be applied to the entire content view, when converting the high bit depth content to a lower bit depth for display). In an embodiment where the remapping is limited to the region of interest, the high bit depth stream may be limited so that only the portion of the video stream related to the region of interest is delivered to the client.

In one example, the user defines or selects regions of interest on a static image of a paused video stream. The various remapping options may be presented to the user as icons that correlate to different remapping options. The user may select remapping options for each region of interest or have the same remapping option applied to each region of interest. To facilitate previewing the remapping options, the client device may request a high bit depth representation of the static image (or of a media segment from which the static image may be decoded and extracted) when the video is paused. As each remapping option is selected, the client device remaps the high bit depth static image into each of the selected remapping options and displays a remapped version of the static image. Upon resuming the video stream, the client device then receives the high bit depth stream and remaps it using the selected remapping options into the appropriate bit depth for display on the client device.

The video streams may be saved as different segments, in portions of varying lengths, or at various locations across a network. When providing the video stream to a client device, the client device receives the portions of the video streams in order to sequentially display the video at the client device.

One exemplary embodiment selects remappings for different viewing conditions. For example, different remappings may be used for dark versus bright ambient viewing conditions. In some embodiments, ambient brightness is measured on an 8-bit scale, with 0 representing the dark end of the scale and 255 representing the bright end. This exemplary embodiment may be used with plasma, LCD, LED, and OLED device types. For this exemplary embodiment, the manifest is extended to carry information regarding the additional remappings that are available. The client chooses the specific viewing option based on ambient illumination, display type, user preferences, or preferences or logic coded into the client software.

For another exemplary embodiment, the client may determine the display technology type (such as based on a capability exchange with the display, based on knowledge of a built-in display type associated with client hardware, or based on user input that identifies the display type connected to the client device). In another exemplary embodiment, the client takes input from sensors to determine viewing conditions. In such an embodiment, the client uses an ambient light sensor at the client device to determine the amount of ambient light. The client may use any of these sources of information, parse metadata or labels associated with the various alternative remappings, and choose an appropriate remapping stream to request from the server.

TABLE 2 provides an example of a DASH MPD manifest that may be used in some embodiments:

TABLE 2

```
<?xml version="1.0" encoding="UTF-8"?>
<MPD
..
<ProgramInformation>
<Title>Example of a DASH Media Presentation Description for bit depth representations</Title>
</ProgramInformation>
<Period>
<!—Video with 4 bit depth and viewing examples-->
<AdaptationSet segmentAlignment="true" subsegmentAlignment="true" subsegmentStartsWithSAP="1">
    <Role schemeIdUri="urn:mpeg:dash:role:2011" value="main"/>
    <SupplementalProperty schemeIdUri="urn:mpeg:dash:rtvideoparam:2014" value="1920,1080"/>
<Representation mimeType="video/mp4" codecs="avc1.42c033" width="1920" height="1080"
bandwidth="1055223" ViewingCondition="18" ViewingDeviceType ="LED">
    <BaseURL> video1.mp4</BaseURL>
    <SegmentBase indexRangeExact="true" indexRange="839-990"/>
</Representation>
<Representation mimeType="video/mp4" codecs="avc1.42c033" width="1920" height="1080"
bandwidth="1055223" ViewingCondition="65" ViewingDeviceType ="LED">
    <BaseURL> video2.mp4</BaseURL>
    <SegmentBase indexRangeExact="true" indexRange="839-990"/>
</Representation>
<Representation mimeType="video/mp4" codecs="avc1.42c033" width="1920" height="1080"
bandwidth="1055223" ViewingCondition="200" ViewingDeviceType ="LED">
    <BaseURL> video3.mp4</BaseURL>
    <SegmentBase indexRangeExact="true" indexRange="839-990"/>
</Representation>
<Representation mimeType="video/mp4" codecs="avc1.42c033" width="1920" height="1080"
bandwidth="1055223" ViewingCondition="18" ViewingDeviceType ="PLASMA">
    <BaseURL> video4.mp4</BaseURL>
    <SegmentBase indexRangeExact="true" indexRange="839-990"/>
</Representation>
<Representation mimeType="video/mp4" codecs="avc1.42c033" width="1920" height="1080"
bandwidth="1055223" ViewingCondition="65" ViewingDeviceType ="PLASMA">
    <BaseURL> video5.mp4</BaseURL>
    <SegmentBase indexRangeExact="true" indexRange="839-990"/>
</Representation>
<Representation mimeType="video/mp4" codecs="avc1.42c033" width="1920" height="1080"
bandwidth="1055223" ViewingCondition="200" ViewingDeviceType ="PLASMA">
    <BaseURL> video6.mp4</BaseURL>
    <SegmentBase indexRangeExact="true" indexRange="839-990"/>
</Representation>
</AdaptationSet>
```

The sample MPD of TABLE 2 shows an example of device type and viewing conditions. The end user may take an interest in other parameters, thereby creating an MPD with additional items. In embodiments using DASH, parameters such as ViewingCondition and ViewingDeviceType may be included in an MPD file. ViewingCondition may specify an ambient light condition for which a given content representation is appropriate. ViewingCondition may, for example, range from 0 to 255 (darkest to brightest). ViewingDeviceType may specify a display type for which a given content representation is appropriate. ViewingDeviceType may, for example, assign different values to different types of display, such as plasma, CRT, LCD, LED, OLED, HDR10, HDR12, HDR14, and HDR16 displays. In an alternative embodiment, the ViewingDeviceType may be divided into a color space parameter and a display type model, which may include parameters such as DisplayType, dynamic range, luma intensity range, and other parameters used to describe any display type.

The example MPD of TABLE 2 makes six representations available for selection by the client. Three representations are optimized for LED display types under three ambient lighting conditions ("ViewingCondition"), and three representations are optimized for plasma display types under the same three ambient lighting conditions.

A client receiving the MPD above may access an ambient light sensor (e.g., a light sensor built into a phone, tablet, or smart TV executing the client application) to determine the viewing location's ambient light level. The client may then determine the display technology (e.g., based on a capability exchange with the display, based on knowledge of a built-in display type associated with client hardware, or based on user input that identifies the display type connected to the client device). The client matches the ambient light level and display technology type to the options labeled in the MPD file to determine which representation to request from the server. For example, if the client determines that connected display is LED and that the local ambient light level is 58, then the client may request the representation with BaseURL of video2.mp4 because this profile provides the closest match of display technology and ambient light level.

A client may use display type mapping logic to provide a close match if an alternative remapping stream for the actual display type is not available. For example, if a client determines the actual display type is LCD but only LED and plasma alternative remapping streams are available, then the client may choose LED based on the similarity in imaging characteristics between LED and LCD displays. Different remappings may be transmitted as independent profiles in an adaptive bit rate (ABR) system such as HTTP Live Streaming (HLS), flash, or DASH.

TABLE 3 presents an exemplary embodiment for an MPD which defines a single region of interest. The MPD includes alternative remappings which may be used for enhanced viewing of the region of interest. To this end, the MPD uses the following syntax parameters to define the regions of interest and to present the content representations prepared based on the alternative remappings: Num_Objects may signal the number of objects (e.g. regions of interest) to be defined. In the example, Num_Objects=1 signals that a single region of interest is defined. Object_x_position and Object_y_position may signal the horizontal and vertical positions of the region of interest. Object_x_size and Object_y_size may signal the horizontal and vertical size (or bounding box size) for the region of interest. The region of interest position and size may be used by the client, for example, to indicate visually to the user the regions of interest for which alternative remappings may be available, and to facilitate visual selection of the region-based remapping options by the user. Object_UserData may convey a human readable name or label for an object or region of interest. This may also be displayed in order to facilitate selection of the region in a user interface. These various parameters may have an object index enclosed in brackets (e.g. "[1]") to indicate to which object the parameter applies. The various parameters in the example of Table 3 all apply to a first object ([1]).

In the example of Table 3, each of multiple content representations may have a Object_Mapping parameter which may indicate whether the bit depth remapping used to prepare the content representation was prepared in consideration of (e.g. optimized for) a given object or region of interest. For example, the first and second content representations shown in the example (which correspond to segment-1.ts and segment-2.ts) have Object_Mapping[1]="0" which may indicate that these representations were prepared with a remapping which was not designed to enhance the first region of interest (or the first object), or was not optimized for this region. The third and fourth content representations shown in the example (which correspond to segment-3.ts and segment-4.ts) have Object_Mapping[1]="1", which may indicate that these representations were prepared with a remapping which was designed to enhance the first region of interest, or that was optimized for this region. Thus the client may select either of the third and fourth content representations in order to display content which visually enhances the first object, which in this case is the "Quarterback".

TABLE 3

```
<?xml version="1.0" encoding="UTF-8"?>
<MPD
..
<ProgramInformation>
<Title>Example of a DASH Media Presentation Description for ROI HDR mappings</Title>
</ProgramInformation>
<Period>
<AdaptationSet segmentAlignment="true" subsegmentAlignment="true" subsegmentStartsWithSAP="1">
    <Role schemeIdUri="urn:mpeg:dash:role:2011" value="main"/>
    <SupplementalProperty schemeIdUri="urn:mpeg:dash:rtvideoparam:2014" value="1920,1080"
Num_Objects="1" Object_x_position[1]="456" Object_y_position[1]="800" Object_x_size[1]="640"
Object_y_size[1]="480" Object_UserData[1]="Quarterback" />
<Representation mimeType="video/mp4" codecs="avc1.644029" width="1920" height="1080"
bandwidth="1055223" Object_Mapping[1]="0" >
    <SegmentList timescale="90000" duration="900000">
        <RepresentationIndex sourceURL="representation-index.sidx"
        <SegmentURL media="segment-1.ts"/>
    </SegmentList>
</Representation>
<Representation mimeType="video/mp4" codecs="avc1.644029" width="1280" height="720"
bandwidth="855223" Object_Mapping[1]="0" >
    <SegmentList timescale="90000" duration="900000">
        <RepresentationIndex sourceURL="representation-index.sidx"/>
        <SegmentURL media="segment-2.ts"/>
    </SegmentList>
</Representation>
<Representation mimeType="video/mp4" codecs="avc1.644029" width="1920" height="1080"
bandwidth="1055223" Object_Mapping[1]="1" >
    <SegmentList timescale="90000" duration="900000">
        <RepresentationIndex sourceURL="representation-index.sidx"
        <SegmentURL media="segment-3.ts"/>
    </SegmentList>
</Representation>
<Representation mimeType="video/mp4" codecs="avc1.644029" width="1280" height="720"
bandwidth="855223" Object_Mapping[1]="1" >
    <SegmentList timescale="90000" duration="900000">
        <RepresentationIndex sourceURL="representation-index.sidx"/>
        <SegmentURL media="segment-4.ts"/>
    </SegmentList>
</Representation>
</AdaptationSet>
```

TABLE 4 is an example of an MPD with two available ROIs. As in the previous example, the size and location of these regions of interest are defined by the parameters Object_x_size[ ], Object_y_size[ ], Object_x_position[ ], and Object_y_position[ ]. A first defined object corresponds to the "Quarterback", and a second defined object corresponds to the "Wide Receiver" as can be seen from the Object_UserData fields. For this exemplary example, the MPD contains eight available representations. Each representation in this example is bound by <Representation . . . > and </Representation> markers. For this exemplary embodiment, the entire set of representations contains definitions for four mapping scenarios with each scenario defined for a 1920×1080 display and a 1280×720 display. The four mapping scenarios are: the default mappings, ROI 1 with a remap, ROI 2 with a remap, and ROI 1 and ROI 2 both remapped. The Object_Mapping[ ] parameters indicate for each content representation which of the ROI's are enhanced via the remapping which was used to create that content representation. In an embodiment, a client may receive an MPD which contains object (or region of interest) definitions and Object_Mapping indicators as exemplified in Table 4, may use object definition parameters such as object size, object position, and object user data to identify the available regions of interest in a user interface, may allow the user to select one or more of the available regions of interest for enhancement, and may then select and request a content representation from a streaming server which was prepared using a remapping which enhances the selected regions of interest. The client may switch (e.g. based on network conditions) between multiple ABR variants of the content representation which enhances the selected objects.

TABLE 4

```
<?xml version="1.0" encoding="UTF-8"?>
<MPD
..
<ProgramInformation>
<Title>Example of a DASH Media Presentation Description for two ROI HDR mappings</Title>
</ProgramInformation>
<Period>
<AdaptationSet segmentAlignment="true" subsegmentAlignment="true" subsegmentStartsWithSAP="1">
    <Role schemeIdUri="urn:mpeg:dash:role:2011" value="main"/>
    <SupplementalProperty schemeIdUri="urn:mpeg:dash:rtvideoparam:2014" value="1920,1080"
Num_Objects="2" Object_x_position[1]="456" Object_y_position[1]="800" Object_x_size[1]="640"
Object_y_size[1]="480" Object_UserData[1]="Quarterback" Object_x_position[2]="1020"
Object_y_position[2]="720" Object_x_size[2]="380" Object_y_size[2]="210" Object_UserData[2]="Wide
Receiver" />
<Representation mimeType="video/mp4" codecs="avc1.644029" width="1920" height="1080"
bandwidth="1055223" " Object_Mapping[1]="0" Object_Mapping[2]="0" >
    <SegmentList timescale="90000" duration="900000">
        <RepresentationIndex sourceURL="representation-index.sidx"
        <SegmentURL media="segment-1.ts"/>
    </SegmentList>
</Representation>
<Representation mimeType="video/mp4" codecs="avc1.644029" width="1280" height="720"
bandwidth="855223" " Object_Mapping[1]="0" Object_Mapping[2]="0" >
    <SegmentList timescale="90000" duration="900000">
        <RepresentationIndex sourceURL="representation-index.sidx"/>
        <SegmentURL media="segment-2.ts"/>
    </SegmentList>
</Representation>
<Representation mimeType="video/mp4" codecs="avc1.644029" width="1920" height="1080"
bandwidth="1055223" " Object_Mapping[1]="1" Object_Mapping[2]="0" >
    <SegmentList timescale="90000" duration="900000">
        <RepresentationIndex sourceURL="representation-index.sidx"
        <SegmentURL media="segment-3.ts"/>
    </SegmentList>
</Representation>
<Representation mimeType="video/mp4" codecs="avc1.644029" width="1280" height="720"
bandwidth="855223" " Object_Mapping[1]="1" Object_Mapping[2]="0" >
    <SegmentList timescale="90000" duration="900000">
        <RepresentationIndex sourceURL="representation-index.sidx"/>
        <SegmentURL media="segment-4.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="1" >
    <SegmentList timescale="90000" duration="900000">
        <RepresentationIndex sourceURL="representation-index.sidx"
        <SegmentURL media="segment-5.ts"/>
    </SegmentList>
</Representation>
<Representation mimeType="video/mp4" codecs="avc1.644029" width="1280" height="720"
bandwidth="855223" Object_Mapping[1]="0" Object_Mapping[2]="1" >
    <SegmentList timescale="90000" duration="900000">
        <RepresentationIndex sourceURL="representation-index.sidx"/>
        <SegmentURL media="segment-6.ts"/>
    </SegmentList>
</Representation>
<Representation mimeType="video/mp4" codecs="avc1.644029" width="1920" height="1080"
bandwidth="1055223" Object_Mapping[1]="1" Object_Mapping[2]="1" >
    <SegmentList timescale="90000" duration="900000">
        <RepresentationIndex sourceURL="representation-index.sidx"
        <SegmentURL media="segment-7.ts"/>
    </SegmentList>
</Representation>
<Representation mimeType="video/mp4" codecs="avc1.644029" width="1280" height="720"
bandwidth="855223" Object_Mapping[1]="1" Object_Mapping[2]="1" >
```

TABLE 4-continued

```
    <SegmentList timescale="90000" duration="900000">
        <RepresentationIndex sourceURL="representation-index.sidx"/>
        <SegmentURL media="segment-8.ts"/>
    </SegmentList>
</Representation>
</AdaptationSet>
```

Note that in the MPD examples herein, Object x,y position and size fields may use pixel units that correspond to the first representation of the adaption set. If secondary representations exist (e.g. at resolutions which differ from that of the first representation), the object x, y size and position values may be scaled to the secondary representation's picture dimensions with a linear scale factor.

The field Object_Mapping[n] may indicate whether the remapping is designed to highlight, enhance, or improve the contrast of the nth object (equivalently, the nth region of interest). Object_Mapping[n]=0 may indicate that the pixel values (or distribution of pixel values) taken from the nth object is not used to create the bit-depth remapping which produced the content representation. Object_Mapping[n]=0 may indicate that the remapping for the content representation is not designed to improve the contrast or enhance the appearance of the nth object. Object_Mapping[n]=0 may indicate that the remapping for the content representation is not optimized based on the content within the nth object. Object_Mapping[n]=1, on the other hand, may indicate that the pixel values (or distribution of pixel values) taken from the nth object were used to create the bit-depth remapping which produced the content representation, that the remapping was designed to improve the contrast or enhance the appearance of the nth object, or that the remapping is optimized in some way based on the content within the nth object.

In one embodiment, a content representation may be prepared using different bit-depth remapping functions for different objects (e.g. different regions of interest). For example, a first remapping may be used to remap the pixel values in a first region of interest, and a second remapping may be used to remap the pixel values in a second region of interest. In this case, each region r which carries an indication of Object_Mapping[r]=1 may have its own specially designed or optimized remapping. Areas which do not correspond to a defined region of interest, or regions r which carry an indication of Object_Mapping[r]=0 may have been prepared using a default remapping which was not specially designed nor optimized for the object, region, or area. Applying different remappings to different regions of the same content representation may create boundary artifacts between regions. In this case, some smoothing algorithm may be applied to make the boundary artifacts less visible to the viewer. For example, a remapping used in one region or area may be morphed or blended with a remapping used in a neighboring region or area and may be applied to the boundary between the two regions or areas to avoid visible boundary artifacts.

In another embodiment, a content representation may be prepared using a single bit-depth remapping function which may have been prepared to enhance one or multiple regions of interest or objects. For example, pixel values from the various regions r which carry an indication of Object_Mapping[r]=1 may be used as input to an algorithm which designs a remapping (e.g. optimal remapping) for enhancing contrast. The resulting remapping may be applied to the entire content when producing a given content representation. Thus the objects or regions r which carry an indication of Object_Mapping[r]=1 may be visually enhanced within the content representation, while other defined regions or areas outside of any defined regions may not be enhanced.

The field Object_UserData[n] enables the client to present user interface selection criteria for the object. Such a field may hold proprietary user data, such as a human readable label or description for the object. Each representation identified in the MPD may be generated with different ROI bit depth mappings. These mappings may increase detail in dark or light areas compared to the overall intensity of the video frame size.

A client device receiving an MPD may represent the ROI on the UI in a variety of ways. The SupplementalProperty element of an adaption set may be used to indicate the number of ROIs available to the client. The client may use the Object_UserData[ ] field to display information describing aspects of the ROI. For example, in a sporting contest, the Object_UserData[ ] field may specify player information. As another example, in a movie, the Object_UserData[ ] field may specify movie characters or physical objects in the movie which may be selected and enhanced.

With three display types and two ROI mappings, for example, the MPD may contain six tone-remapped streams in addition to the default stream. Also, there may be one or more ROIs corresponding to each ROI tone or bit depth remapping. For each ROI, the coordinates and the ROI type are specified. In this case, the user application displays the ROIs available when requested by an end user. When the end user selects a specific ROI, the stream corresponding to that mapping (also taking into account the display type) is sent to the end user.

The minimal unit of time is a segment. If a remapping effect lasts less than a segment, the remapped stream contains remapped information for the portion of time when remapping is done. The remainder of the segment is a normal segment stream irrespective of choice of ROI. Each ROI may have multiple bit depth or tone remappings (e.g., to accommodate for lighting conditions). The current MPD architecture may be extended to this case and with additional streams for selection by the end application based on end user inputs. Another alternative presentation may use the ROI instead of the original video with ROI remapped regions.

If more than one ROI is available with different mappings, then combinations of different ROI mappings may also be available. For example, with two ROIs, four representations may be available: default (e.g. neither ROI is remapped), only ROI 1 remapped, only ROI 2 remapped, and both ROI's are remapped. If each ROI has multiple available remappings, then the number of representations increases.

In addition to the different mappings for the regions of interest, the overall video frame mapping may be optimized for specific viewing conditions (such as a bright or dark room) or for specific viewing devices such as LED, CRT, plasma, or other display types. ViewingCondition and ViewingDeviceType parameters may be transmitted for each representation and in combination with different ROI Mappings.

An exemplary MPD is illustrate in TABLE 5. In the exemplary MPD of TABLE 5, the MPD identifies different representations generated using respective bit depth remappings that have been optimized for different regions of interest (corresponding to objects 1 and 2), different display types (LED or plasma), and different viewing conditions (e.g. ambient brightness of 18 or 54).

TABLE 5

```
<?xml version="1.0" encoding="UTF-8"?>
<MPD
..
<ProgramInformation>
<Title>Example of a DASH Media Presentation Description for two ROI HDR mappings with 1 lighting condition
and
2 display types</Title>
</ProgramInformation>
<Period>
<AdaptationSet segmentAlignment="true" subsegmentAlignment="true" subsegmentStartsWithSAP="1">
    <Role schemeIdUri="urn:mpeg:dash:role:2011" value="main"/>
    <SupplementalProperty schemeIdUri="urn:mpeg:dash:rtvideoparam:2014" value="1920,1080"
Num_Objects="2" Object_x_position[1]="456" Object_y_position[1]="800" Object_x_size[1]="640"
Object_y_size[1]="480" Object_UserData[1]="Quarterback" Object_x_position[2]="1020"
Object_y_position[2]="720" Object_x_size[2]="380" Object_y_size[2]="210" Object_UserData[2]="Wide
Receiver" />
<Representation mimeType="video/mp4" codecs="avc1.644029" width="1920" height="1080"
bandwidth="1055223" " Object_Mapping[1]="0" Object_Mapping[2]="0" ViewingCondition="18"
ViewingDeviceType ="LED">
    <SegmentList timescale="90000" duration="900000">
        <RepresentationIndex sourceURL="representation-index.sidx"
        <SegmentURL media="segment-1.ts"/>
    </SegmentList>
</Representation>
<Representation mimeType="video/mp4" codecs="avc1.644029" width="1280" height="720"
bandwidth="855223" " Object_Mapping[1]="0" Object_Mapping[2]="0" ViewingCondition="18"
ViewingDeviceType ="LED">
    <SegmentList timescale="90000" duration="900000">
        <RepresentationIndex sourceURL="representation-index.sidx"/>
        <SegmentURL media="segment-2.ts"/>
    </SegmentList>
</Representation>
<Representation mimeType="video/mp4" codecs="avc1.644029" width="1920" height="1080"
bandwidth="1055223" " Object_Mapping[1]="1" Object_Mapping[2]="0" ViewingCondition="18"
ViewingDeviceType ="LED">
    <SegmentList timescale="90000" duration="900000">
        <RepresentationIndex sourceURL="representation-index.sidx"
        <SegmentURL media="segment-3.ts"/>
    </SegmentList>
</Representation>
<Representation mimeType="video/mp4" codecs="avc1.644029" width="1280" height="720"
bandwidth="855223" " Object_Mapping[1]="1" Object_Mapping[2]="0" ViewingCondition="18"
ViewingDeviceType ="LED">
    <SegmentList timescale="90000" duration="900000">
        <RepresentationIndex sourceURL="representation-index.sidx"/>
        <SegmentURL media="segment-4.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="1" ViewingCondition="18"
ViewingDeviceType ="LED">
    <SegmentList timescale="90000" duration="900000">
        <RepresentationIndex sourceURL="representation-index.sidx"
        <SegmentURL media="segment-5.ts"/>
    </SegmentList>
</Representation>
<Representation mimeType="video/mp4" codecs="avc1.644029" width="1280" height="720"
bandwidth="855223" Object_Mapping[1]="0" Object_Mapping[2]="1" ViewingCondition="18"
ViewingDeviceType ="LED" >
    <SegmentList timescale="90000" duration="900000">
        <RepresentationIndex sourceURL="representation-index.sidx"/>
        <SegmentURL media="segment-6.ts"/>
    </SegmentList>
</Representation>
<Representation mimeType="video/mp4" codecs="avc1.644029" width="1920" height="1080"
bandwidth="1055223" Object_Mapping[1]="1" Object_Mapping[2]="1" ViewingCondition="18"
ViewingDeviceType ="LED" >
    <SegmentList timescale="90000" duration="900000">
        <RepresentationIndex sourceURL="representation-index.sidx"
        <SegmentURL media="segment-7.ts"/>
    </SegmentList>
</Representation>
<Representation mimeType="video/mp4" codecs="avc1.644029" width="1280" height="720"
```

TABLE 5-continued

```
bandwidth="855223" Object_Mapping[1]="1" Object_Mapping[2]="1" ViewingCondition="18"
ViewingDeviceType ="LED" >
    <SegmentList timescale="90000" duration="900000">
        <RepresentationIndex sourceURL="representation-index.sidx"/>
        <SegmentURL media="segment-8.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="0" ViewingCondition="18"
ViewingDeviceType ="PLASMA">
    <SegmentList timescale="90000" duration="900000">
        <RepresentationIndex sourceURL="representation-index.sidx"
        <SegmentURL media="segment-9.ts"/>
    </SegmentList>
</Representation>
<Representation mimeType="video/mp4" codecs="avc1.644029" width="1280" height="720"
bandwidth="855223" " Object_Mapping[1]="0" Object_Mapping[2]="0" ViewingCondition="18"
ViewingDeviceType ="PLASMA">
    <SegmentList timescale="90000" duration="900000">
        <RepresentationIndex sourceURL="representation-index.sidx"/>
        <SegmentURL media="segment-10.ts"/>
    </SegmentList>
</Representation>
<Representation mimeType="video/mp4" codecs="avc1.644029" width="1920" height="1080"
bandwidth="1055223" " Object_Mapping[1]="1" Object_Mapping[2]="0" ViewingCondition="18"
ViewingDeviceType ="PLASMA">
    <SegmentList timescale="90000" duration="900000">
        <RepresentationIndex sourceURL="representation-index.sidx"
        <SegmentURL media="segment-11.ts"/>
    </SegmentList>
</Representation>
<Representation mimeType="video/mp4" codecs="avc1.644029" width="1280" height="720"
bandwidth="855223" " Object_Mapping[1]="1" Object_Mapping[2]="0" ViewingCondition="18"
ViewingDeviceType ="PLASMA">
    <SegmentList timescale="90000" duration="900000">
        <RepresentationIndex sourceURL="representation-index.sidx"/>
        <SegmentURL media="segment-12.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="1" ViewingCondition="18"
ViewingDeviceType ="PLASMA">
    <SegmentList timescale="90000" duration="900000">
        <RepresentationIndex sourceURL="representation-index.sidx"
        <SegmentURL media="segment-13.ts"/>
    </SegmentList>
</Representation>
<Representation mimeType="video/mp4" codecs="avc1.644029" width="1280" height="720"
bandwidth="855223" Object_Mapping[1]="0" Object_Mapping[2]="1" ViewingCondition="18"
ViewingDeviceType ="PLASMA" >
    <SegmentList timescale="90000" duration="900000">
        <RepresentationIndex sourceURL="representation-index.sidx"/>
        <SegmentURL media="segment-14.ts"/>
    </SegmentList>
</Representation>
<Representation mimeType="video/mp4" codecs="avc1.644029" width="1920" height="1080"
bandwidth="1055223" Object_Mapping[1]="1" Object_Mapping[2]="1" ViewingCondition="18"
ViewingDeviceType ="PLASMA" >
    <SegmentList timescale="90000" duration="900000">
        <RepresentationIndex sourceURL="representation-index.sidx"
        <SegmentURL media="segment-15.ts"/>
    </SegmentList>
</Representation>
<Representation mimeType="video/mp4" codecs="avc1.644029" width="1280" height="720"
bandwidth="855223" Object_Mapping[1]="1" Object_Mapping[2]="1" ViewingCondition="18"
ViewingDeviceType ="PLASMA" >
    <SegmentList timescale="90000" duration="900000">
        <RepresentationIndex sourceURL="representation-index.sidx"/>
        <SegmentURL media="segment-16.ts"/>
    </SegmentList>
</Representation>
Representation mimeType="video/mp4" codecs="avc1.644029" width="1920" height="1080"
bandwidth="1055223" " Object_Mapping[1]="0" Object_Mapping[2]="0" ViewingCondition="54"
ViewingDeviceType ="LED">
    <SegmentList timescale="90000" duration="900000">
        <RepresentationIndex sourceURL="representation-index.sidx"
        <SegmentURL media="segment-17.ts"/>
    </SegmentList>
</Representation>
<Representation mimeType="video/mp4" codecs="avc1.644029" width="1280" height="720"
```

TABLE 5-continued

```
bandwidth="855223"" Object_Mapping[1]="0" Object_Mapping[2]="0" ViewingCondition="54"
ViewingDeviceType ="LED">
    <SegmentList timescale="90000" duration="900000">
        <RepresentationIndex sourceURL="representation-index.sidx"/>
        <SegmentURL media="segment-18.ts"/>
    </SegmentList>
</Representation>
<Representation mimeType="video/mp4" codecs="avc1.644029" width="1920" height="1080"
bandwidth="1055223" " Object_Mapping[1]="1" Object_Mapping[2]="0" ViewingCondition="54"
ViewingDeviceType ="LED">
    <SegmentList timescale="90000" duration="900000">
        <RepresentationIndex sourceURL="representation-index.sidx"
        <SegmentURL media="segment-19.ts"/>
    </SegmentList>
</Representation>
<Representation mimeType="video/mp4" codecs="avc1.644029" width="1280" height="720"
bandwidth="855223" " Object_Mapping[1]="1" Object_Mapping[2]="0" ViewingCondition="54"
ViewingDeviceType ="LED">
    <SegmentList timescale="90000" duration="900000">
        <RepresentationIndex sourceURL="representation-index.sidx"/>
        <SegmentURL media="segment-20.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="1" ViewingCondition="54"
ViewingDeviceType ="LED">
    <SegmentList timescale="90000" duration="900000">
        <RepresentationIndex sourceURL="representation-index.sidx"
        <SegmentURL media="segment-21.ts"/>
    </SegmentList>
</Representation>
<Representation mimeType="video/mp4" codecs="avc1.644029" width="1280" height="720"
bandwidth="855223" Object_Mapping[1]="0" Object_Mapping[2]="1" ViewingCondition="54"
ViewingDeviceType ="LED" >
    <SegmentList timescale="90000" duration="900000">
        <RepresentationIndex sourceURL="representation-index.sidx"/>
        <SegmentURL media="segment-22.ts"/>
    </SegmentList>
</Representation>
<Representation mimeType="video/mp4" codecs="avc1.644029" width="1920" height="1080"
bandwidth="1055223" Object_Mapping[1]="1" Object_Mapping[2]="1" ViewingCondition="54"
ViewingDeviceType ="LED" >
    <SegmentList timescale="90000" duration="900000">
        <RepresentationIndex sourceURL="representation-index.sidx"
        <SegmentURL media="segment-23.ts"/>
    </SegmentList>
</Representation>
<Representation mimeType="video/mp4" codecs="avc1.644029" width="1280" height="720"
bandwidth="855223" Object_Mapping[1]="1" Object_Mapping[2]="1" ViewingCondition="54"
ViewingDeviceType ="LED" >
    <SegmentList timescale="90000" duration="900000">
        <RepresentationIndex sourceURL="representation-index.sidx"/>
        <SegmentURL media="segment-24.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="0" ViewingCondition="54"
ViewingDeviceType ="PLASMA">
    <SegmentList timescale="90000" duration="900000">
        <RepresentationIndex sourceURL="representation-index.sidx"
        <SegmentURL media="segment-25.ts"/>
    </SegmentList>
</Representation>
<Representation mimeType="video/mp4" codecs="avc1.644029" width="1280" height="720"
bandwidth="855223" " Object_Mapping[1]="0" Object_Mapping[2]="0" ViewingCondition="54"
ViewingDeviceType ="PLASMA">
    <SegmentList timescale="90000" duration="900000">
        <RepresentationIndex sourceURL="representation-index.sidx"/>
        <SegmentURL media="segment-26.ts"/>
    </SegmentList>
</Representation>
<Representation mimeType="video/mp4" codecs="avc1.644029" width="1920" height="1080"
bandwidth="1055223" " Object_Mapping[1]="1" Object_Mapping[2]="0" ViewingCondition="54"
ViewingDeviceType ="PLASMA">
    <SegmentList timescale="90000" duration="900000">
        <RepresentationIndex sourceURL="representation-index.sidx"
        <SegmentURL media="segment-27.ts"/>
    </SegmentList>
</Representation>
<Representation mimeType="video/mp4" codecs="avc1.644029" width="1280" height="720"
```

TABLE 5-continued

```
bandwidth="855223" " Object_Mapping[1]="1" Object_Mapping[2]="0" ViewingCondition="54"
ViewingDeviceType ="PLASMA">
    <SegmentList timescale="90000" duration="900000">
        <RepresentationIndex sourceURL="representation-index.sidx"/>
        <SegmentURL media="segment-28.ts"/>
    </SegmentList>
</Representation>
<Representation mimeType="video/mp4" codecs="avc1.644029" width="1920" height="1080"
bandwidth="1055223" " Object_Mapping[1]="0" Object_Mapping[2]="1" ViewingCondition="54"
ViewingDeviceType ="PLASMA">
    <SegmentList timescale="90000" duration="900000">
        <RepresentationIndex sourceURL="representation-index.sidx"
        <SegmentURL media="segment-29.ts"/>
    </SegmentList>
</Representation>
<Representation mimeType="video/mp4" codecs="avc1.644029" width="1280" height="720"
bandwidth="855223" Object_Mapping[1]="0" Object_Mapping[2]="1" ViewingCondition="54"
ViewingDeviceType ="PLASMA" >
    <SegmentList timescale="90000" duration="900000">
        <RepresentationIndex sourceURL="representation-index.sidx"/>
        <SegmentURL media="segment-30.ts"/>
    </SegmentList>
</Representation>
<Representation mimeType="video/mp4" codecs="avc1.644029" width="1920" height="1080"
bandwidth="1055223" Object_Mapping[1]="1" Object_Mapping[2]="1" ViewingCondition="54"
ViewingDeviceType ="PLASMA" >
    <SegmentList timescale="90000" duration="900000">
        <RepresentationIndex sourceURL="representation-index.sidx"
        <SegmentURL media="segment-31.ts"/>
    </SegmentList>
</Representation>
<Representation mimeType="video/mp4" codecs="avc1.644029" width="1280" height="720"
bandwidth="855223" Object_Mapping[1]="1" Object_Mapping[2]="1" ViewingCondition="54"
ViewingDeviceType ="PLASMA" >
    <SegmentList timescale="90000" duration="900000">
        <RepresentationIndex sourceURL="representation-index.sidx"/>
        <SegmentURL media="segment-32.ts"/>
    </SegmentList>
</Representation>
</AdaptationSet>
```

Several scenarios may be used to select the stream profile, such as automatic, manual, or visual cueing. For automatic detection, the end client application uses logic to determine viewing conditions (such as dark or light ambient environments) and the display type. The end client automatically requests the stream best optimized for the end user.

For manual detection, the UI presents the end user with an array of options or settings to choose the remapping profile. This profile represents different viewing device types and/or viewing conditions. The user manually selects the mode and the client application uses this selection to make an appropriate request to the streaming server.

Visual cueing presents another option to select a stream profile. The client application may make this mode available to the user. The MPD may include descriptions of regions and/or objects for further highlighting. For example, these definitions may be done by periodically transmitting as side information (e.g. in-band in the media segments, in the MPD itself, or in a separately available file identified in the MPD via a URL) a static JPEG map representing the scene. The JPEG image may indicate graphically the regions and/or highlighting for which one or more alternative bit-depth remappings may be available. The alternative views (representing different remappings) for specific regions may be presented, and an end user may choose to replay scenes using these alternatives (e.g. with a different bit depth remapping optimized for a particular region or object of interest).

In some embodiments, the client presents a user interface and allows a user to select a region of interest from among multiple ROIs overlaid on the content imagery. In the UI, the client may classify regions of interest based on metadata that define ROIs to use available alternative new remapping streams. Such metadata may be received from a content server (e.g., in a manifest file such as a DASH MPD; in the content segments; or in a separate side information file which the client may request and/or receive). Based on this user ROI selection, the client may request an alternative remapping.

Figure 4:
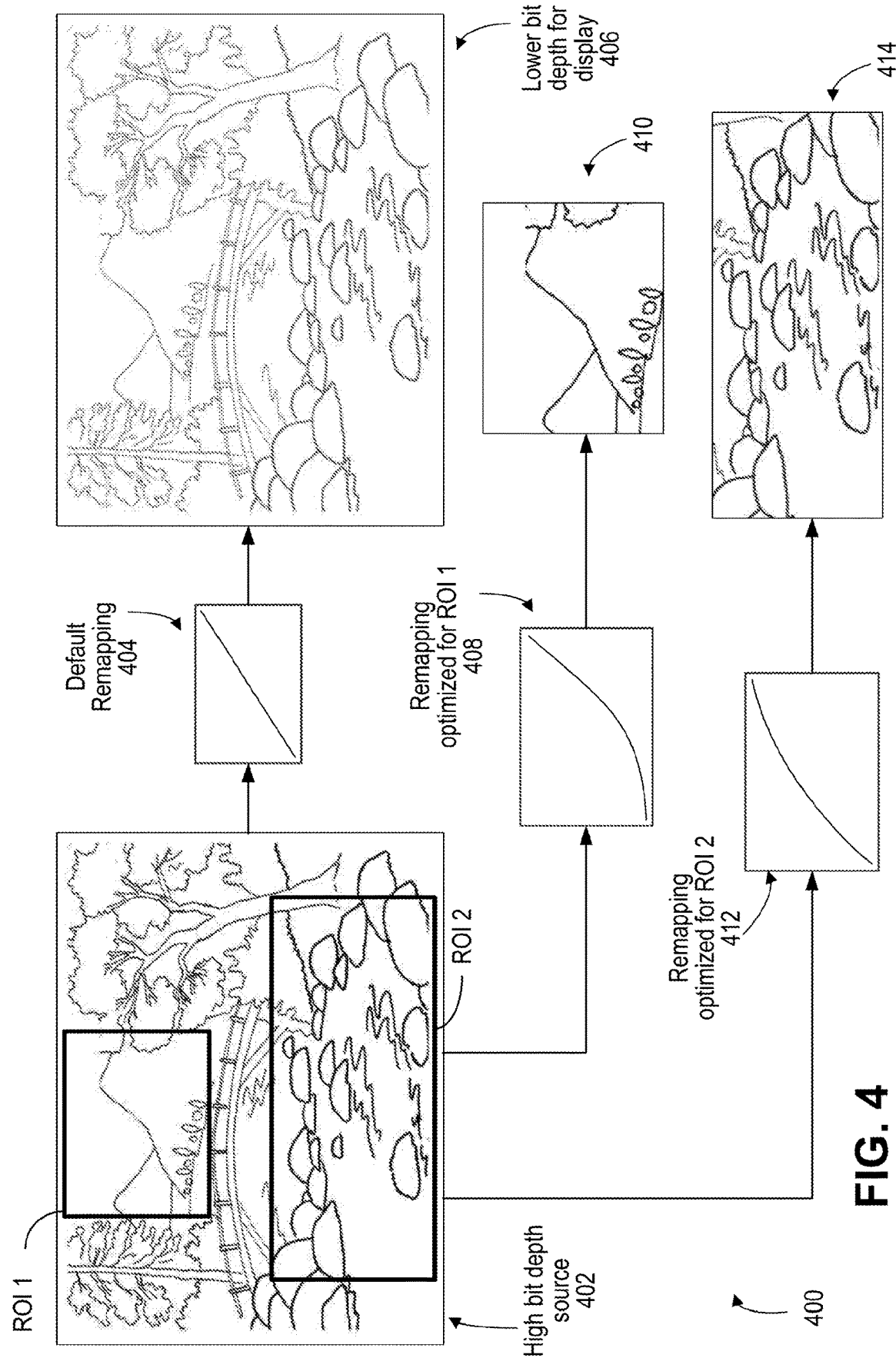
FIG. 4 is a schematic illustration illustrating selection of different bit depth remappings for different regions of interest, in accordance with an embodiment.

FIG. 4 is a schematic illustration of an exemplary ROI selection process. In particular, FIG. 4 depicts the ROI selection process 400 that includes a frame of a high bit depth source 402, a default remapping 404 and a frame of a low bit depth for display 404.

The high bit depth source video frame 402 includes two regions of interest, ROI 1 at the top-center and ROI 2 at the bottom. In the example of FIG. 4, ROI 1 is a region that includes brightly-lit mountaintops, and ROI 2 is a region that includes a shaded brook. The position and dimensions of these regions of interest may be signaled to the client, e.g. in a manifest file. In some embodiments, the regions of interest may be defined on the client side (e.g. based on user input through a UI). A default remapping 404 is used to convert the high bit depth source frame 402 into a lower bit depth for display 406. When the default bit depth remapping 404 is used (e.g. a linear remapping), features in the mountaintops and the stream may be difficult to discern.

If a user selects ROI 1, the bit depth remapping 408 is selected (e.g. from available representations signaled in the manifest) that optimizes the visibility of features in the mountaintops. This remapping may be, for example, a remapping that provides greater detail in brighter regions, as shown in the portion of the frame 410. This remapping may be a remapping that is applied to the entire frame. As a result, some detail may be lost in shadowed regions (e.g. some banding or loss of detail may be visible in ROI 2), but the mountaintop features in ROI 1 will be visible with higher quality.

If a user selects ROI 2, the bit depth remapping 412 is be selected (e.g. from available representations signaled in the manifest) that optimizes the visibility of features in the brook. This remapping may be, for example, a remapping that provides greater detail in darker regions. This remapping may be a remapping that is applied to the entire frame. As a result, some detail may be lost in brighter regions (e.g. some banding or loss of detail may be visible in ROI 1), but the brook regions of ROI 2 will be displayed with higher quality.

If a user selects both ROI 1 and ROI 2, a bit depth remapping may be selected (e.g. from available representations signaled in the manifest) that balances optimization for visibility of features in the brook and the mountaintops. This remapping may be, for example, a remapping that provides greater detail in the brightest and the darkest regions. This remapping may be a remapping that is applied to the entire frame. As a result, some detail may be lost in mid-tone regions (e.g., some banding or loss of detail may be visible outside ROI 1 and ROI 2), but the mountaintop region of ROI 1 and the brook region of ROI 2 will be displayed with higher quality (though not necessarily with the same quality that could be seen if one of those regions was selected individually).

Another option is to identify regions of interest semi-automatically. For example, an automatic segmentation or clustering algorithm (e.g., as described above) may create an initial segmentation of the imagery into regions of interest, and a user (such as an artist or content producer) interacts with this segmentation via a UI. The user selects which areas to designate as regions of interest and may edit the boundaries of those ROIs (e.g., by adding or moving segmentation boundaries, or by merging multiple regions). Manual editing may help, for example, when automatic algorithms have failed to produce the desired results.

A suitable (e.g., optimal) conversion function may be defined for the pixel values in a region of interest. For example, a histogram may be generated from the pixel values which fall within a given ROI, and a suitable (or optimal) conversion function may be generated from the histogram. Exemplary techniques that may be used for generation of a conversion function from histogram data are described in, for example, R. Mantuik et al., *Display Adaptive Tone Mapping*, 27 (3) ACM Transactions on Graphics (2008), available at <http://resources.mpi-inf.mpg.de/hdr/datmo/mantiuk08datm.pdf.

Alternately, a suitable conversion function may be created for user-defined (e.g., artist- or content producer-defined) ROIs. For example, a user interface may display the imagery and indicate the boundaries of the ROI. The user interface may display a prototype conversion function similar to the ones shown in FIG. 1, and may allow a user to edit the conversion function and see (e.g., in real time) the effect on the image. For example, the user may add control points to a conversion function graph and/or move control points to change the shape of the curve. In this way, a user may interactively design a conversion function which emphasizes the details important to the user.

To improve visibility under current viewing conditions, a client may act in response to a cue (e.g. a user input, or automatic detection of an ambient illumination level) to request a representation at a higher bit depth (e.g. a bit depth higher than the display bit depth). The client may receive the higher bit depth representation and may apply locally a bit depth mapping to generate a remapped representation at the display bit depth. The locally-applied bit depth mapping may be selected to optimize the visibility of the video under current viewing conditions and/or to optimize the visibility within a selected region of interest.

In some embodiments, a user provides input to select a particular ROI. For example, in FIG. 4, if a user selects ROI 1, the bit depth remapping 408 is selected to optimize the visibility of features in the mountaintops. This remapping may be, for example, a remapping that provides greater detail in brighter regions. In some embodiments, this optimized remapping is applied only to pixels in ROI 1, with the remaining pixels in the frame being remapped to the display bit depth using the default remapping function 404, such as a linear function. In other embodiments, this remapping may be a remapping that is applied to the entire frame. As a result of applying the remapping to the entire frame, some detail may be lost in shadowed regions (e.g. some banding may be visible in ROI 2), but the mountaintop features in ROI 1 will be visible with higher quality.

If a user selects ROI 2, the bit depth remapping 412 may be selected that optimizes the visibility of features in the shaded brook. This remapping may be, for example, a remapping that provides greater detail in darker regions. In some embodiments, this optimized remapping is applied only to pixels in ROI 2, with the remaining pixels in the frame being remapped to the display bit depth using a default remapping function, such as a linear function. In other embodiments, this remapping may be a remapping that is applied to the entire frame. As a result of applying the remapping to the entire frame, some detail may be lost in brighter regions (e.g. some banding may be visible in ROI 1), but the shadowy brook features in ROI 2 will be visible with higher quality.

In some embodiments, a user may select both ROI 1 and ROI 2. In this case, separate bit depth remappings may be applied to those regions as described above. In other embodiments, if a user selects both ROI 1 and ROI 2, a bit depth remapping may be selected that balances optimization for visibility of features in the brook and the mountaintops. This remapping may be, for example, a remapping that provides greater detail in the brightest and in the darkest regions. This remapping may be a remapping that is applied to the entire frame. As a result, some detail may be lost in mid-tone regions (e.g., some banding may be visible outside ROI 1 and ROI 2), but the mountaintop region of ROI 1 and brook region of ROI 2 will be displayed with higher quality (though perhaps not with the same quality that could be seen if one of those regions was selected individually).

Thus, using techniques described herein, a client may request video representations that have higher bit depth than a bit depth that is ultimately caused to be displayed on a display. The client selects a bit depth remapping, which may be optimized for viewing conditions (e.g. ambient illumination or type of display) and apples the selected bit depth remapping to generate remapped representations at the display bit depth.

Figure 5:
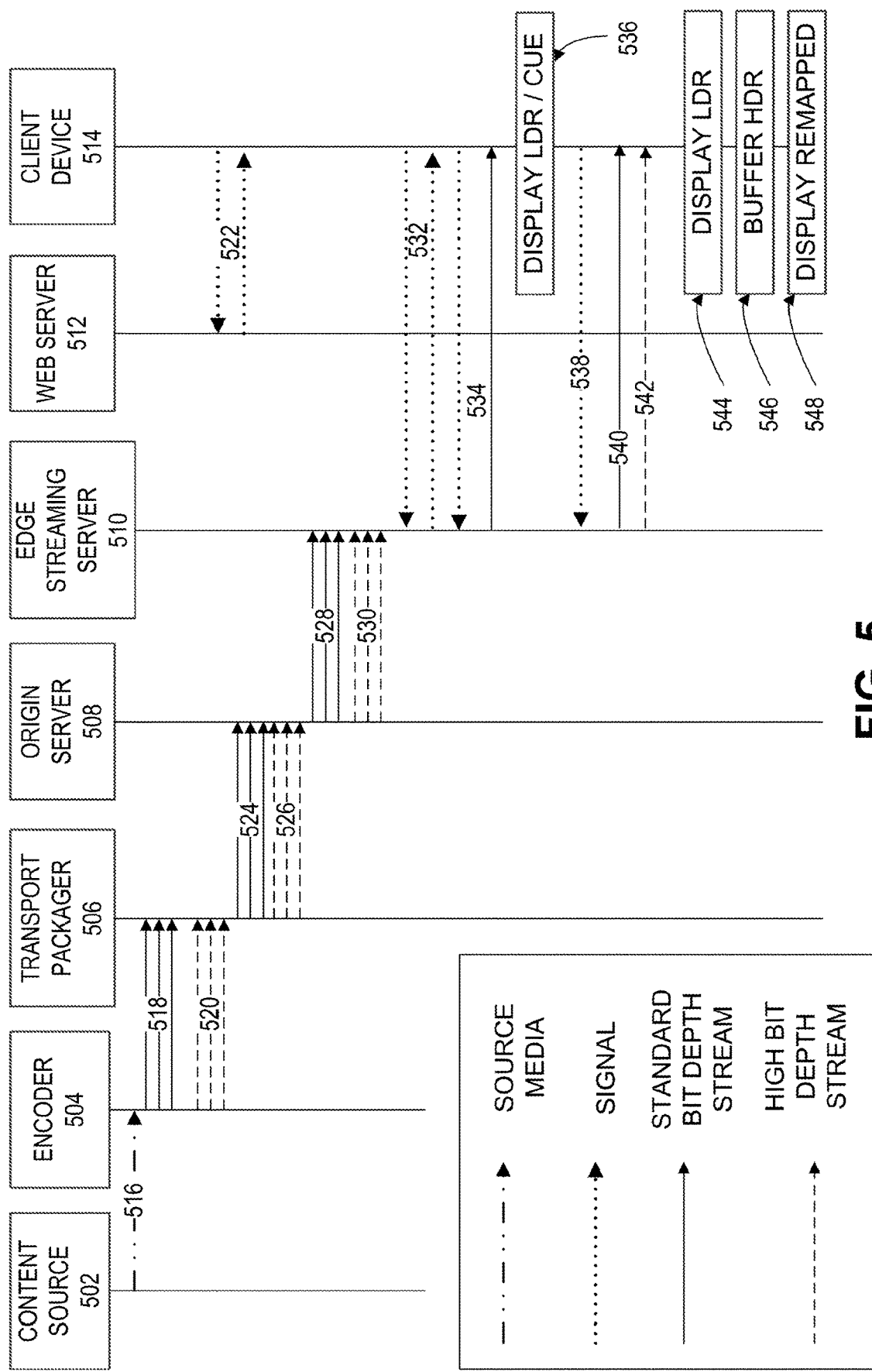
FIG. 5 is a system flow diagram for a streaming video session in which multiple bit depth remappings are available, in accordance with an embodiment.

FIG. 5 is a system flow diagram for a streaming video session in which multiple bit depth remappings are available, in accordance with an embodiment. FIG. 5 depicts communications between a content source 502, an encoder

504, a transport packager 506, an origin server 508, an edge streaming server 510, a web server 512, and a client device 514.

The content source 502 transmits a compressed or uncompressed media stream of the source media to an encoder at a high bit depth at 516. The encoder 504 separately creates reduced (standard) depth ABR streams and full-depth (high bit depth) ABR streams. (For a given bit-depth, the various ABR streams may represent different encoding points which may vary in properties such as bit rate and/or resolution). The various ABR streams at both the reduced depth (518) and full depth (520) are transmitted to a transport packager 506. The transport packager 506 may segment the files and make the files available via an ftp or http download and prepare a manifest.

Note that the content preparation entities and steps shown in FIG. 5 are by way of example and should not be taken as limiting. Variations are possible, for example entities may be combined at the same location or into the same physical device. Also, the segmented media content 524 and 526 may be delivered to the origin server 508, to one or multiple edge streaming servers 510 via 528 and 530, to a combination of these server types, or any suitable media server from which a media client may request the media content. A manifest file (e.g. a DASH MPD) which describes the media content may be prepared in advance and delivered to the streaming server (e.g. the origin server and/or the edge streaming server), or the manifest file may be generated dynamically in response to a client request for the manifest file.

At 522, the client device 514 transmits a signal to a web server requesting to download the media content and receives a streaming server redirect signal. At 532, the client device 514 requests a manifest which describes the available content files (e.g. media segment files). The request may be sent from the client device 514 to a server. The server (e.g. origin server 508 or an edge streaming server 510) delivers the manifest file in response to the client device request. The manifest indicates availability of the various ABR streams at standard and high bit depths.

At 534, the client device 514 requests, from the streaming server 510, a standard bit depth stream and the streaming server 510 responsively transmits the standard bit depth stream (e.g. media segments of that standard bit depth stream) to the client device 514. The client device 514 displays the standard bit depth stream at 536.

The client device 514 may detect a cue to request an alternate bit depth representation of the content. For example, the cue may be user input wherein the user selects a feature or content representation which would require the client to obtain a higher bit depth representation of the content (e.g. higher than the standard bit depth representation), or which would require the client to obtain the content at its original capture bit depth. The user may select a region of interest to highlight, or may turn on a feature where the client adaptively remaps the higher bit depth content in consideration of a specific region of interest, a viewing condition, or a display technology. The cue may be detection by the client of a viewing condition or a change in viewing conditions for which the client has appropriate logic to convert a higher bit depth representation to a lower bit depth representation using a remapping appropriate for the current viewing conditions. In response to the client device detecting a cue to request an alternate bit depth, the client device requests the high bit depth stream from the streaming server and the streaming server responsively streams the high bit depth stream to the client device.

At 544, the client device 514 continues to receive and display the standard bit depth stream for a time period 546 to allow additional buffering of the high bit depth stream to reduce playback latency. The high bit depth stream 542 (or a remapped and possibly bit-depth converted version thereof) is displayed at 548 when a sufficient amount of the high bit depth content is received and buffered at the client. The client device 514, or an application associated with the client device, may perform a remapping from the high bit depth stream to a different bit depth at the client device. The user at the client device may then control which remapped version to display on the user device 514. Alternatively, a different network entity may perform the remapping from the high bit depth stream to the requested bit depth stream and transmit, over a network, the remapped bit depth stream to the client device. The remapping may be based on or appropriate for a region of interest, a viewing condition, or a specific display technology.

In accordance with an embodiment, a client may be configured with an application configured to remap high bit depth data. The high bit rate stream is delivered by default to the client and a local remapping down to a lower bit depth occurs at the client device. The client may remap down to a lower bit depth in the client application. In alternative embodiments, the generation of lower bit depth versions occurs on the network side for delivery of lower bit depth content to legacy devices which are not configured to remap high bit depth at the client device.

The cueing to request an alternate bit depth stream may be based on viewing conditions or the viewing device type, among other possibilities. Different viewing conditions include the ambient lighting, such as a dark ambient light or a bright ambient light as detected by the client device. Different viewing device types may include a plasma display, an LCD display, an LED display, an OLED display, and the like, and different makes and models of those viewing devices.

The cueing may be manual (under user control) or automatic. In manual cueing, the user is presented with a set of choices representing the various remapping targets that may be selected via a user interface. In automatic cueing, an application associated with the client device detects a change in viewing conditions or device type and automatically sets the remapping function for optimal viewing. In this embodiment, a small region of the image (e.g. a region of interest) is remapped (HDR to LDR) in a zoomed in stream. Since the region is likely to have more uniform pixel characteristics when compared to the entire scene, (e.g. region may be all in shadow or all in bright, etc.) then a custom conversion may be used to improve the picture quality. Using end user feedback to implement this function is an interactive approach and may best be done in the client application, to avoid server latencies.

The client device may also request an alternate bit depth stream for one or more regions of interests associated with the video stream. The user may manually interact with the content and mark off the regions for which an alternate bit depth stream is requested. If the placement of the region varies from frame to frame, the location of the requested region of interest may be updated and the alternate bit depth stream for that updated location is sent to the client device. For example, the client may receive a zoomed view of a region of interest at a higher (e.g. original capture) bit depth. The client may analyze the pixel value distribution for the received region of interest (for a single frame, or across multiple frames) to determine an appropriate (e.g. optimal) remapping function for the zoomed region of interest. The client may then apply the remapping function when converting the content from the higher bit depth to a lower bit depth for display at the client.

In addition to the traditional ABR streams, the headend creates additional streams for different alternative bit depth remappings in some embodiments. All remappings done at the headend may be made available at the streaming server. The process depicted in FIG. 5 may also be used to distribute multiple alternative remappings in addition to multiple different bit depth streams. The MPD contains a description of the available remappings and a description of their representation to the end user. The alternative remappings may correspond to different regions of interest, different rendering devices, different viewing conditions, or combinations of these various factors. In the embodiment of FIG. 5, each remapping may result in a separate encoding and a separate bit stream group (e.g. with multiple ABR profiles) for each of the combinations. For example, using two regions of interest, targeting two end device types and two viewing conditions results in N=8 remappings.

The specific content preparation entities and content preparation sequence shown in FIG. 5 is provided as an example, and should not be taken as limiting. For example, some of the entities shown in FIG. 5 may be combined, and some of the steps may be performed in a different order. Also, in some cases media segments or manifests may not be available from an edge streaming server, and in this case the client may request such objects directly from an origin server or other streaming server. Content preparation as described herein is intended to encompass the generation of content using multiple alternative bit-depth remappings and multiple different ABR profiles, and delivery of such content to a suitable streaming server. Generation of a manifest file may be performed in advance, as shown in FIG. 5, or may be performed in response to a request for the manifest file from a media client.

In the method of FIG. 5, the end user client device requests a service and receives a manifest that includes information indicating the availability of streams with different bit depth remappings. The client may request and may receive a manifest file (e.g. a DASH MPD). The client may parse the manifest file and may request media content (e.g. a media stream, or media segments) in order to begin playback of the content. Initially the client may request media content prepared using a default remapping. For example, the default remapping may not correspond to a particular region of interest, to a particular display technology, or to particular viewing conditions. In the UI, the user may be informed about the availability of additional streams that represent remappings for different device types, different viewing conditions, or different enhanced regions of interest. The client may display such information in the client UI based on the description of the available alternative bit-depth remappings, as provided in the manifest. The client may allow the user to select one of the available alternative remappings. Based on the user selection, the client may request a content representation (e.g. a stream or specific media segments) which corresponds to the selected remapping. The client may receive the requested content representation, and may switch to displaying that representation to the user.

The MPD contains information identifying various available choices to the client. Some options may be automatically selected by the end device client application (such as options relating to viewing conditions or device type). The client may present to the user (e.g. in the UI) various available region of interest options. In one embodiment, the user selects the region of interest to enhance. The client may select a content representation from among those enumerated in the manifest which matches the region of interest selected by the user, and which most closely matches the current viewing conditions and/or display type determined (e.g. automatically) by the client. The client may request the selected content representation (e.g. a stream or media segments of that content representation), and may switch to displaying the selected content representation when enough content has arrived at the client to begin playback.

An exemplary embodiment use case applies to security services that provide tools to enhance the viewing of security footage. Another exemplary embodiment applies to sports. Such services provide increased detail for portions of a sports event. Sporting events may have sunlight and shadow areas. Because the events are live, the camera or production crew may be unable to provide perfect dynamic range across the image. The automatic detection of ROIs with different LDR conversions may provide the viewer with options to see detail. Instant replay for sports demonstrates another example where automatic detection may be helpful.

Several additional scenarios provide situations where automatic detection is available. The stream uses a spatial subset of the whole source. For example, a small region of the image may be encoded in a stream. Because this ROI is small and likely to have more uniform pixel characteristics (e.g., all pixels are in a shadow or all pixels are in bright light), then a custom conversion may be used to improve picture quality.

Another scenario concerns where the entire spatial image area may be too dark or too light. The additional stream may be used to provide a different HDR to LDR conversion remapping that represents the best overall image for the end viewer.

For each of the previous two use cases, a user watching the LDR result may control conversion through a user interface. For example, the user may in a user interface define a region to enhance, and/or the user may select whether viewing-condition based remapping or display device type based remapping should be applied. Parameters which represent the user's choices (e.g. a definition of the region specified by or selected by the user, and the user's selection or non-selection of viewing-condition and/or device-type based remappings) may be relayed to the server, for example such parameters may be conveyed in a client-to-server request for media content or for one or more media segments. The remapping may be done at the headend, and the media server may transmit the remapped content to the client device for display to a user.

In another embodiment, an automatic partition into spatial segments may be done at the headend side to detect dark or light areas in the LDR signal and automatically provide independent streams for those spatial regions with different LDR conversions.

One embodiment takes the form of a method of adapting media stream playout comprising. The method comprises: receiving information regarding availability of a plurality of representations of a video presentation, wherein the plurality of representations vary in at least bit depth; requesting, from a server, and causing display of, a first portion of a video presentation at a first bit depth associated with a first representation. Responsive to an alternative bit depth cue: requesting, from the server, a second representation of a second portion of the video presentation, wherein the second representation has a second bit depth; remapping the second representation from the second bit depth to the first bit depth; and causing a display of the remapped second representation.

In one such embodiment, the alternative bit depth cue is a user input. In another such embodiment, the alternative bit depth cue is a detected change in viewing conditions. Detecting a change in viewing conditions may comprise detecting a change in an ambient light level detected by a client device or detecting a change in the display device.

In one embodiment, the second representation represents a region of a full video frame area. In such an embodiment, the region is defined by a user via a user interface on a client device. The region is selected from among a plurality of regions by a user via a user interface on a client device or is selected automatically by a client device application.

In one embodiment, a determination of the change in viewing conditions is determined at a client device. The determination of the change in viewing conditions is responsive to a viewing-conditions change request received from a user.

In one embodiment the second bit depth is higher than the first bit depth. For example, the first bit depth is 8 bits per pixel and the second bit depth is 12 bits per pixel.

In one embodiment, a client device maps the second bit depth to a selected display bit depth associated with a display device.

In one embodiment, the information regarding availability of the plurality of representations is received via a media presentation description.

Another embodiment takes the form of a method of providing selectable-bit-depth video to a client device, the method comprising: generating a first representation of a first video segment at a first bit depth; generating a second representation of the first video segment at a second bit depth; sending, to the client device, information regarding the first representation and the second representation; receiving, from the client device, information associated with the selection of the second representation of the first video segment at the second depth; sending data associated with the second representation of the first video segment at the second bit depth to the client device. In one such embodiment, the first video segment represents a region of a full video frame area.

Another embodiment takes the form of a method of providing a selectable bit-depth video to a client device, the method comprising: generating a first and a second representation at a first and a second bit depth, respectively; sending, to the client device, a manifest comprising information regarding the first and second representations; sending the first representation to the client device; receiving, from the client device, a request to receive the second representation; sending, to the client device, the second representation, mapping, at the client device, the second representation to a third representation at a third bit depth; and displaying, at the client device, the third representation. In such an embodiment, the request to receive the second representation is responsive to the client device detecting a change in viewing conditions.

Another embodiment takes the form of a method comprising: providing to a client device a manifest file identifying at least a first representation and a second representation of a video segment, wherein the manifest file further identifies a first bit depth of the first representation and a second bit depth of the second representation; receiving from the client device a request for a selected one of the first and second representations; and providing the selected representation to the client device. In one such embodiment, the manifest file is a DASH MPD.

Another embodiment takes the form of a method comprising: receiving at a client device a manifest file identifying at least a first representation and a second representation of a video segment, wherein the manifest file further identifies a first bit depth of the first representation and a second bit depth of the second representation; detecting a viewing parameter at the client device; selecting one of the first and second representations based on the detected viewing parameter; retrieving the selected representation from a server; remapping the selected representation to a display bit depth; and causing display of the remapped selected representation.

In such an embodiment, the manifest file is a DASH MPD.

In such an embodiment, the viewing parameter is ambient illumination.

Another embodiment takes the form of a method of adapting playout of a media stream available at a first bit depth and a second bit depth, the method comprising: receiving information regarding availability of a plurality of representations of the media stream, wherein the plurality of representations vary in at least bit depth; requesting, from a server, and causing display of, the media stream at the first bit depth associated with a first representation in the plurality of representations of the media stream; responsive to an alternative bit depth cue: requesting, from the server, a second representation in the plurality of representations of the media stream, wherein the second representation is associated with the second bit depth; and causing a client device to display a video derived from the second representation.

In one such embodiment, deriving the video from the second representation comprises remapping the second representation to a third bit depth.

In another such embodiment, the client device: displays the media stream derived from the first representation while the client device buffers the second representation; and transitions to displaying the video derived from the second representation after buffering a portion of the second representation.

One embodiment takes the form of a client device configured to: receive a first representation of a video stream and a manifest file identifying at least the first representation and a second representation of a video segment, wherein the manifest file further identifies a first bit depth of the first representation and a second bit depth of the second representation; display the first representation of the video stream; detect a change in viewing conditions; in response to detecting the change in viewing conditions, request the second representation of the video stream; and transition to displaying a video based on the second representation of the video stream.

Another embodiment takes the form of a system to provide selectable-bit-depth video to a client device, the system comprising: a network entity configured to: generate a first representation of a first video segment at a first bit depth; generate a second representation of the first video segment at a second bit depth; send, to the client device, information regarding the first representation and the second representation; receive, from the client device, information associated with the selection of the second representation of the first video segment at the second depth; send data associated with the second representation of the first video segment at the second bit depth to the client device.

Exemplary embodiments disclosed herein are implemented using one or more wired and/or wireless network nodes, such as a wireless transmit/receive unit (WTRU) or other network entity. The different nodes for example may be realized as a client device.

Figure 6:
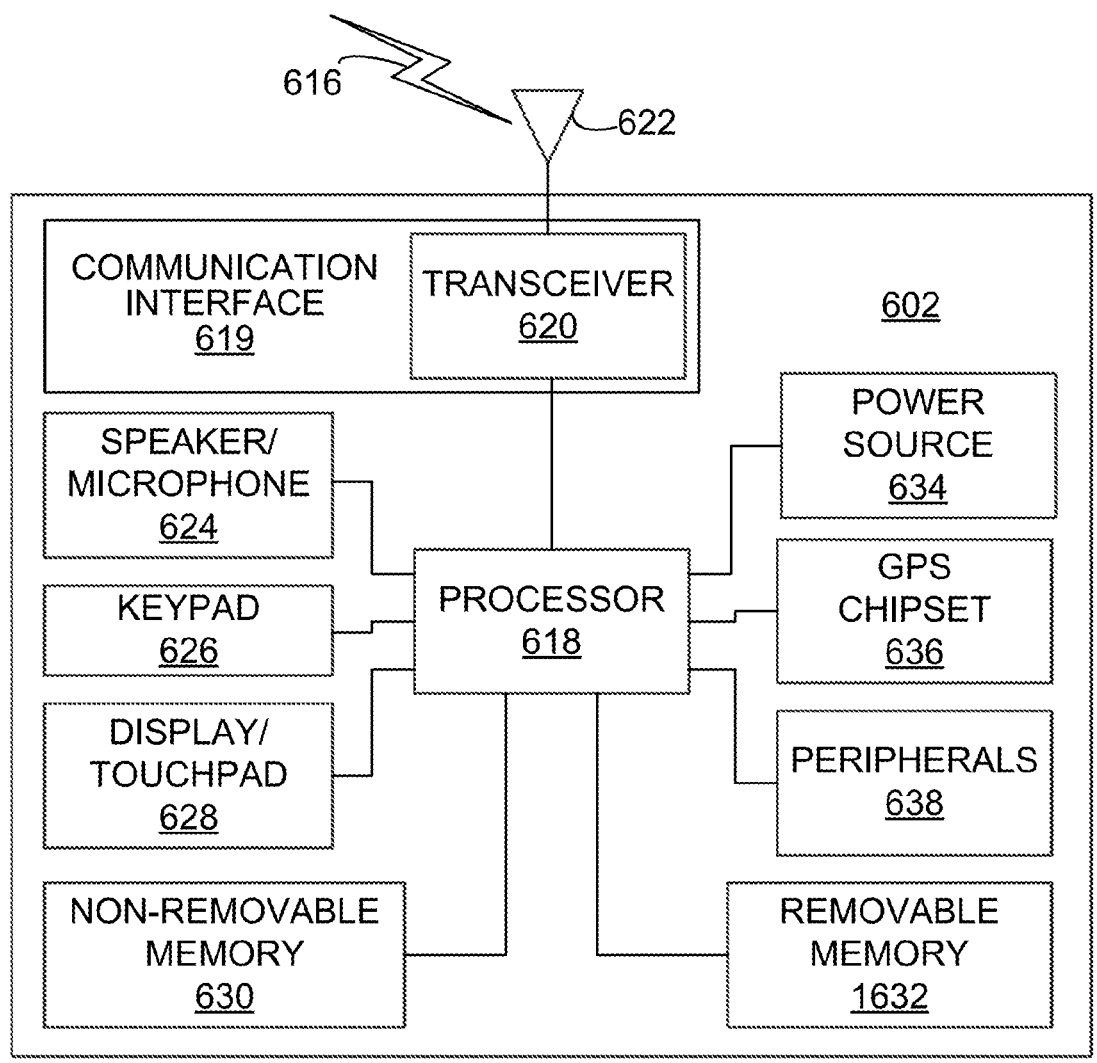
FIG. 6 illustrates an exemplary wireless transmit/receive unit (WTRU) that may be employed as a streaming video client in some embodiments.

FIG. 6 is a system diagram of an exemplary WTRU 602, which may be employed as a client device in embodiments described herein. As shown in FIG. 6, the WTRU 602 may include a processor 618, a communication interface 619 including a transceiver 620, a transmit/receive element 622, a speaker/microphone 624, a keypad 626, a display/touchpad 628, a non-removable memory 630, a removable memory 632, a power source 634, a global positioning system (GPS) chipset 636, and sensors 638. It will be appreciated that the WTRU 602 may include any sub-combination of the foregoing elements while remaining consistent with an embodiment.

The processor 618 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 618 may perform signal coding, data processing, power control, input/output processing, and/or any other functionality that enables the WTRU 602 to operate in a wireless environment. The processor 618 may be coupled to the transceiver 620, which may be coupled to the transmit/receive element 622. While FIG. 6 depicts the processor 618 and the transceiver 620 as separate components, it will be appreciated that the processor 618 and the transceiver 620 may be integrated together in an electronic package or chip.

The transmit/receive element 622 may be configured to transmit signals to, or receive signals from, a base station over the air interface 616. For example, in one embodiment, the transmit/receive element 622 may be an antenna configured to transmit and/or receive RF signals. In another embodiment, the transmit/receive element 622 may be an emitter/detector configured to transmit and/or receive IR, UV, or visible light signals, as examples. In yet another embodiment, the transmit/receive element 622 may be configured to transmit and receive both RF and light signals. It will be appreciated that the transmit/receive element 622 may be configured to transmit and/or receive any combination of wireless signals.

In addition, although the transmit/receive element 622 is depicted in FIG. 6 as a single element, the WTRU 602 may include any number of transmit/receive elements 622. More specifically, the WTRU 602 may employ MIMO technology. Thus, in one embodiment, the WTRU 602 may include two or more transmit/receive elements 622 (e.g., multiple antennas) for transmitting and receiving wireless signals over the air interface 616.

The transceiver 620 may be configured to modulate the signals that are to be transmitted by the transmit/receive element 622 and to demodulate the signals that are received by the transmit/receive element 622. As noted above, the WTRU 602 may have multi-mode capabilities. Thus, the transceiver 620 may include multiple transceivers for enabling the WTRU 602 to communicate via multiple RATs, such as UTRA and IEEE 802.11, as examples.

The processor 618 of the WTRU 602 may be coupled to, and may receive user input data from, the speaker/microphone 624, the keypad 626, and/or the display/touchpad 628 (e.g., a liquid crystal display (LCD) display unit or organic light-emitting diode (OLED) display unit). The processor 618 may also output user data to the speaker/microphone 624, the keypad 626, and/or the display/touchpad 628. In addition, the processor 618 may access information from, and store data in, any type of suitable memory, such as the non-removable memory 630 and/or the removable memory 632. The non-removable memory 630 may include random-access memory (RAM), read-only memory (ROM), a hard disk, or any other type of memory storage device. The removable memory 632 may include a subscriber identity module (SIM) card, a memory stick, a secure digital (SD) memory card, and the like. In other embodiments, the processor 618 may access information from, and store data in, memory that is not physically located on the WTRU 602, such as on a server or a home computer (not shown).

The processor 618 may receive power from the power source 634, and may be configured to distribute and/or control the power to the other components in the WTRU 602. The power source 634 may be any suitable device for powering the WTRU 602. As examples, the power source 634 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 618 may also be coupled to the GPS chipset 636, which may be configured to provide location information (e.g., longitude and latitude) regarding the current location of the WTRU 602. In addition to, or in lieu of, the information from the GPS chipset 636, the WTRU 602 may receive location information over the air interface 616 from a base station and/or determine its location based on the timing of the signals being received from two or more nearby base stations. It will be appreciated that the WTRU 602 may acquire location information by way of any suitable location-determination method while remaining consistent with an embodiment.

The processor 618 may further be coupled to other peripherals 638, which may include one or more software and/or hardware modules that provide additional features, functionality and/or wired or wireless connectivity. For example, the peripherals 638 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 7:
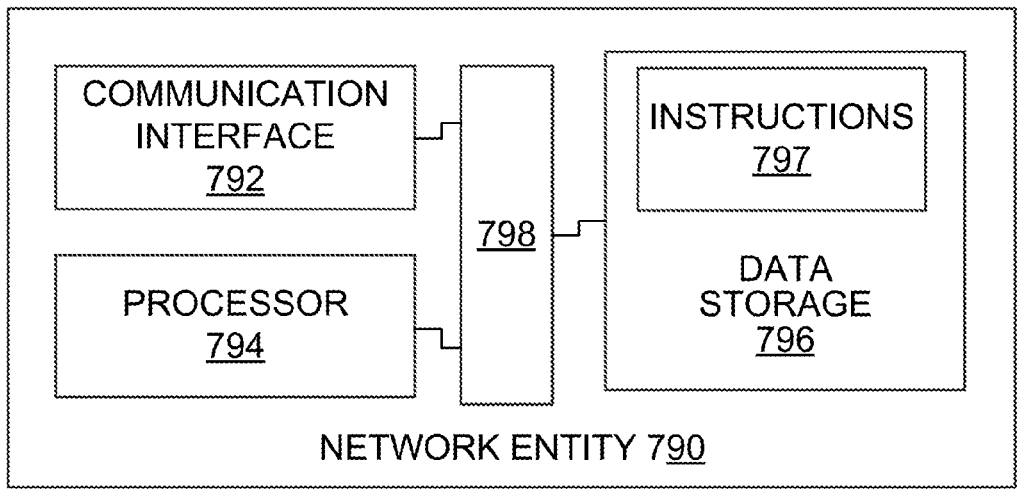
FIG. 7 illustrates an exemplary network entity that may be employed as a streaming server and/or video encoding or transcoding server in some embodiments.

FIG. 7 depicts an exemplary network entity 790 that may be used in embodiments of the present disclosure, for example as a streaming server. As depicted in FIG. 7, network entity 790 includes a communication interface 792, a processor 794, and non-transitory data storage 796, all of which are communicatively linked by a bus, network, or other communication path 798.

Communication interface 792 may include one or more wired communication interfaces and/or one or more wireless-communication interfaces. With respect to wired communication, communication interface 792 may include one or more interfaces such as Ethernet interfaces, as an example. With respect to wireless communication, communication interface 792 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 792 may be equipped at a scale and with a configuration appropriate for acting on the network side—as opposed to the client side—of wireless communications (e.g., LTE communications, Wi-Fi communications, and the like). Thus, communication interface 792 may include the appropriate equipment and circuitry (perhaps including multiple transceivers) for serving multiple mobile stations, UEs, or other access terminals in a coverage area.

Processor 794 may include one or more processors of any type deemed suitable by those of skill in the relevant art, some examples including a general-purpose microprocessor and a dedicated DSP.

Data storage 796 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 7, data storage 796 contains program instructions 797 executable by processor 794 for carrying out various combinations of the various network-entity functions described herein.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method comprising:
    applying a first transformation function to an input video segment having a first bit depth to generate a first distribution video segment having a second bit depth;
    defining a region of interest in the input video;
    applying a second transformation function to the input video segment to generate a second distribution video segment having the second bit depth, wherein the second transformation function is designed for the region of interest, and wherein the first and second transformation functions are different;
    sending, to a client, information identifying the availability of the first and second distribution video segments and information indicating that the second distribution video segment is designed for the region of interest;
    receiving, from the client, a selection of one of the first and second distribution video segments; and
    responsively sending the selected distribution video segment to the client.

2. The method of the claim 1, wherein the first transformation function is a linear transformation function and the second transformation function is a nonlinear transformation function.

3. The method of claim 1, wherein the first transformation function is generated from pixel distribution properties of the input video content overall and the second transformation function is optimized for the region of interest.

4. The method of claim 1, wherein applying the second transformation function includes applying the second transformation function to the entire frame of the input video segment.

5. The method of claim 1, wherein applying the second transformation function includes applying the second transformation function only to the region of interest in the input video segment.

6. The method of claim 5, wherein, in the second video distribution video segment, the first transformation function is applied outside the region of interest.

7. The method of claim 1, wherein defining a region of interest comprises tracking an object in the input video, wherein an image region occupied by the object is used as the region of interest.

8. The method of claim 1, wherein the second transformation function is generated by a method comprising:
    generating a histogram from pixel values within the region of interest; and
    generating the second transformation function from the histogram.

9. The method of claim 1, wherein the information identifying the availability of the first and second distribution video segments and the information indicating that the second distribution video segment is designed for the region of interest is sent in a manifest file.

10. The method of claim 1, wherein the second bit depth is less than the first bit depth.

11. The method of claim 1, wherein the first and second distribution video segments represent a region of a full video frame area.

12. A method comprising, at a client device:
    receiving a manifest file identifying at least a first representation and a second representation of a video, wherein the manifest file indicates that the first representation is generated using a first transformation function designed for a first region of interest within the video;
    receiving a user selection of the first region of interest; and
    in response to the user selection of the first region of interest:
        retrieving the first representation from a server; and
        causing display of the first representation;
    wherein the manifest file further indicates that the second representation is generated using a second transformation function designed for a second region of interest, wherein the first and second transformation functions are different.

13. The method of claim 12, wherein the first transformation function is a transformation from a first bit depth to a second bit depth.

14. A method comprising, at a client device:
    receiving a manifest file identifying at least a first representation and a second representation of a video, wherein the manifest file indicates that the first representation is generated using a first transformation function designed for a first region of interest within the video;
    receiving a user selection of the first region of interest;
    in response to the user selection of the first region of interest:
        retrieving the first representation from a server; and
        causing display of the first representation; and
    causing display of a user interface, wherein the user interface identifies at least the first region of interest, and wherein receiving a user selection of the first region of interest comprises receiving user input through the user interface;

wherein the manifest file includes a label for the first region of interest, and wherein causing display of the user interface comprises causing display of the label for the first region of interest.

15. The method of claim 14, wherein the first transformation function is a transformation from a first bit depth to a second bit depth.

16. A method comprising, at a client device:
receiving a manifest file identifying at least a first representation and a second representation of a video, wherein the manifest file indicates that the first representation is generated using a first transformation function designed for a first region of interest within the video;
receiving a user selection of the first region of interest;
in response to the user selection of the first region of interest:
retrieving the first representation from a server; and
causing display of the first representation; and
causing display of a user interface, wherein the user interface identifies at least the first region of interest, and wherein receiving a user selection of the first region of interest comprises receiving user input through the user interface;
wherein the manifest file includes a label for the first region of interest, and wherein causing display of the user interface comprises causing display of the label for the first region of interest.

17. The method of claim 16, wherein the first transformation function is a transformation from a first bit depth to a second bit depth.

18. An apparatus comprising at least one processor and a non-transitory computer storage medium storing instructions operative, when executed on the processor, to perform functions comprising:
receiving a manifest file identifying at least a first representative and a second representation of a video, wherein the manifest file indicates that the first representation is generated using a first transformation function designed for a first region of interest within the video;
receiving a user selection of the first region of interest; and
in response to the user selection of the first region of interest:
retrieving the first representation from a server; and
causing display of the first representation;
wherein the manifest file further indicates that the second representation is generated using a second transformation function designed for a second region of interest, wherein the first and second transformation functions are different.

19. A apparatus comprising at least one processor and a non-transitory computer storage medium storing instructions operative, when executed on the processor, to perform functions comprising:
receiving a manifest file identifying at least a first representation and a second representation of a video, wherein the manifest file indicates that the first representation is generated using a first transformation function designed for a first region of interest within the video;
receiving a user seletion of the first region of interest; and
in response to the user selection of the first region of interest:
retrieving the first representation from a server; and
causing display of the first representation;
wherein the first region of interest is a time-varying region of interest that tracks a first object, and wherein receiving a user selection of the first region of interest comprises receiving a user selection of the first object.

20. An apparatus comprising at least one processor and a non-transitory computer storage medium storing instructions operative, when executed on the processor, to perform functions comprising:
receiving a manifest file identifying at least a first representation and a second representation of a video, wherein the manifest file indicates that the first representation is generated using a first transformation function designed for a first region of interest within the video;
receiving a user selection of the first region of interest;
in response to the user selection of the first region of interest:
retriving the first representation from a server; and
causing display of the first representation; and
causing display of a user interface, wherein the user interface identitifes at least the first region of interest, and wherein receiving a user selection of the first region of interest comprises receiving user input through the user interface;
wherein the manifest file includes a label for the first region of interest, and wherein causing disply of the user interface comprises causing display of the label for the first region of interest.

* * * * *

UNITED STATES PATENT AND TRADEMARK OFFICE
CERTIFICATE OF CORRECTION

PATENT NO. : 10,956,766 B2
APPLICATION NO. : 16/099402
DATED : March 23, 2021
INVENTOR(S) : Kumar Ramaswamy and Jeffrey Allen Cooper It is certified that error appears in the above-identified patent and that said Letters Patent is hereby corrected as shown below:

In the Claims

Claim 14, Column 36, Line 61: Replace "region of interest" with --region of interest; and--

Claim 14, Column 36, Line 65: Replace "representation; and" with --representation;--

Claim 14, Column 36, Lines 66-67: Delete these lines

Claim 14, Column 36, Line 66: Replace with the following paragraph:
--wherein the first region of interest is a time-varying region of interest that tracks a first object, and wherein receiving a user selection of the first region of interest comprises receiving a user selection of the first object.--

Claim 14, Column 37, Lines 1-7: Delete these lines

Signed and Sealed this
Twenty-first Day of March, 2023

Katherine Kelly Vidal
*Director of the United States Patent and Trademark Office*